United States Patent
Bang et al.

(10) Patent No.: US 11,184,775 B2
(45) Date of Patent: Nov. 23, 2021

(54) METHOD FOR TRANSMITTING FRAME ON BASIS OF SPATIAL REUSE IN WIRELESS LAN SYSTEM AND WIRELESS TERMINAL USING SAME

(71) Applicant: LG ELECTRONICS INC., Seoul (KR)

(72) Inventors: Saehee Bang, Seoul (KR); Jinmin Kim, Seoul (KR); Jinsoo Choi, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 12 days.

(21) Appl. No.: 16/476,834

(22) PCT Filed: Jan. 9, 2018

(86) PCT No.: PCT/KR2018/000405
§ 371 (c)(1),
(2) Date: Jul. 9, 2019

(87) PCT Pub. No.: WO2018/128521
PCT Pub. Date: Jul. 12, 2018

(65) Prior Publication Data
US 2019/0380038 A1    Dec. 12, 2019

Related U.S. Application Data

(60) Provisional application No. 62/444,349, filed on Jan. 9, 2017.

(51) Int. Cl.
*H04W 16/02* (2009.01)
*H04W 16/28* (2009.01)
*H04W 84/12* (2009.01)

(52) U.S. Cl.
CPC .......... *H04W 16/02* (2013.01); *H04W 16/28* (2013.01); *H04W 84/12* (2013.01)

(58) Field of Classification Search
CPC ..................... H04W 74/0833; H04W 74/08
See application file for complete search history.

(56) References Cited

U.S. PATENT DOCUMENTS

2006/0240780 A1   10/2006 Zhu et al.
2009/0109904 A1*   4/2009 Gaur ................. H04W 74/0866
                                            370/329
(Continued)

FOREIGN PATENT DOCUMENTS

KR       20110116978        10/2011
WO     WO-2018059593 A1 *   4/2018    ........ H04W 74/0808

OTHER PUBLICATIONS

PCT International Application No. PCT/KR2018/000405, International Search Report dated Apr. 16, 2018, 4 pages.
(Continued)

*Primary Examiner* — Gregory B Sefcheck
*Assistant Examiner* — Debebe A Asefa
(74) *Attorney, Agent, or Firm* — Lee, Hong, Degerman, Kang & Waimey

(57) ABSTRACT

A method for transmitting a frame on the basis of spatial reuse performed by an SR STA including a plurality of directional antenna modules in a wireless LAN system according to one embodiment of the present invention comprises the steps of: performing a legacy backoff procedure by counting down a first backoff value set on the basis of a set of legacy EDCA parameters in order to transmit an omnidirectional frame, wherein the set of the legacy EDCA parameters includes a legacy CWmin value and a legacy CWmax value corresponding to each of a plurality of ACs; performing an SR backoff procedure by counting down a second backoff value set on the basis of a set of SR EDCA (Continued)

parameters in order to transmit a directional frame when an interference frame that is not intended to be received by an SR STA is received, wherein the set of the SR EDCA parameters includes an SR_CWmax value corresponding to each of the plurality of ACs, and the SR_CWmax value is set to a value smaller than the legacy CWmax value; and transmitting the directional frame when the SR backoff procedure is completed.

8 Claims, 15 Drawing Sheets

(56) References Cited

U.S. PATENT DOCUMENTS

2010/0014502 A1   1/2010   Singh et al.
2011/0170468 A1   7/2011   Jain et al.

OTHER PUBLICATIONS

Michelle X. Gong, et al., "Directional CSMA/CA Protocol with Spatial Reuse for mmWave Wireless Networks", (http://ieeexplore.ieee.org/document/5684226/), mmWave Wireless Networks, In: 2010 IEEE Global Telecommunications Conference (GLOBECOM 2010), Dec. 6-10, 2010, Jan. 2011, 8 pages.

* cited by examiner (A)

(B)

METHOD FOR TRANSMITTING FRAME ON BASIS OF SPATIAL REUSE IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2018/000405, filed on Jan. 9, 2018, which claims the benefit of U.S. Provisional Application No. 62/444,349, filed on Jan. 9, 2017, the contents of which are all hereby incorporated by reference herein in their entirety.

BACKGROUND OF THE INVENTION

Field of the Invention

The disclosure relates to wireless communication and, more specifically, to a method for transmitting a frame based on spatial reuse in a wireless LAN system and a wireless terminal using the same.

Related Art

IEEE (Institute of Electrical and Electronics Engineers) 802.11ad is an ultra-high-speed wireless communication standard based on beamforming using band characteristics of 60 GHz. This can support throughput of 6 Gbps or higher although a signal arrival range is about 10 m.

Signal propagation is dominated by ray-like propagation since operations are performed in a high frequency band. Signal quality can be improved such that TX (transmit) or RX (receive) antenna beams are aligned to be oriented to a strong spatial signal path.

IEEE 802.11ad provides a beamforming training procedure for antenna beam alignment. IEEE 802.11ay is a next-generation standard that is under development for throughput of 20 Gbps or higher based on IEEE 802.11ad.

SUMMARY OF THE INVENTION

The disclosure provides a method for transmitting a frame based on spatial reuse and a wireless terminal using the same to provide enhanced performance in a wireless LAN system.

A method for transmitting a frame based on spatial reuse, performed by a spatial reuse station (SR STA) including a plurality of directional antenna modules in a wireless LAN system, according to one embodiment includes: performing a legacy backoff procedure by counting down a first backoff value set based on a legacy EDCA parameter set in order to transmit an omnidirectional frame, the legacy EDCA parameter set including a legacy CWmin value and a legacy CWmax value corresponding to each of a plurality of access categories (ACs); performing an SR backoff procedure by counting down a second backoff value set based on an SR EDCA parameter set in order to transmit a directional frame when an interference frame that is not intended to be received by the SR STA is received, the SR EDCA parameter set including an SR_CWmax value corresponding to each of the plurality of ACs, the SR_CWmax value being set to a value smaller than the legacy CWmax value; and transmitting the directional frame when the SR backoff procedure is completed.

According to an embodiment of the disclosure, it is possible to provide a method for transmitting a frame based on spatial reuse and a wireless terminal using the same to provide enhanced performance in a wireless LAN system.

DESCRIPTION OF EXEMPLARY EMBODIMENTS

The above-described features and detailed description below are illustrated to aid in description and understanding of the disclosure. That is, the disclosure is not limited to such embodiments and may be embodied in different forms. The following embodiments are examples for thorough disclosure and explanation for delivering the disclosure to those skilled in the art. Therefore, when there are many methods for implementing components of the disclosure, it is necessary to make it clear that the disclosure can be realized through any of a specific one of these methods and a similar one.

When a certain component includes specific elements or a certain process includes specific steps in the disclosure, other elements or other steps may be further included. That is, the terms used in the disclosure are merely for describing particular embodiments, and are not intended to limit the scope of the disclosure. Furthermore, examples described for aiding in understanding of the invention include complementary embodiments thereof.

All terms including technical or scientific terms have the same meanings as generally understood by a person having ordinary skill in the art to which the disclosure pertains unless mentioned otherwise. Generally used terms, such as terms defined in a dictionary, should be interpreted to coincide with meanings of the related art from the context. Unless differently defined in the present invention, such terms should not be interpreted in an ideal or excessively formal manner. Hereinafter, embodiments of the disclosure will be described with reference to the attached drawings.

Figure 1:
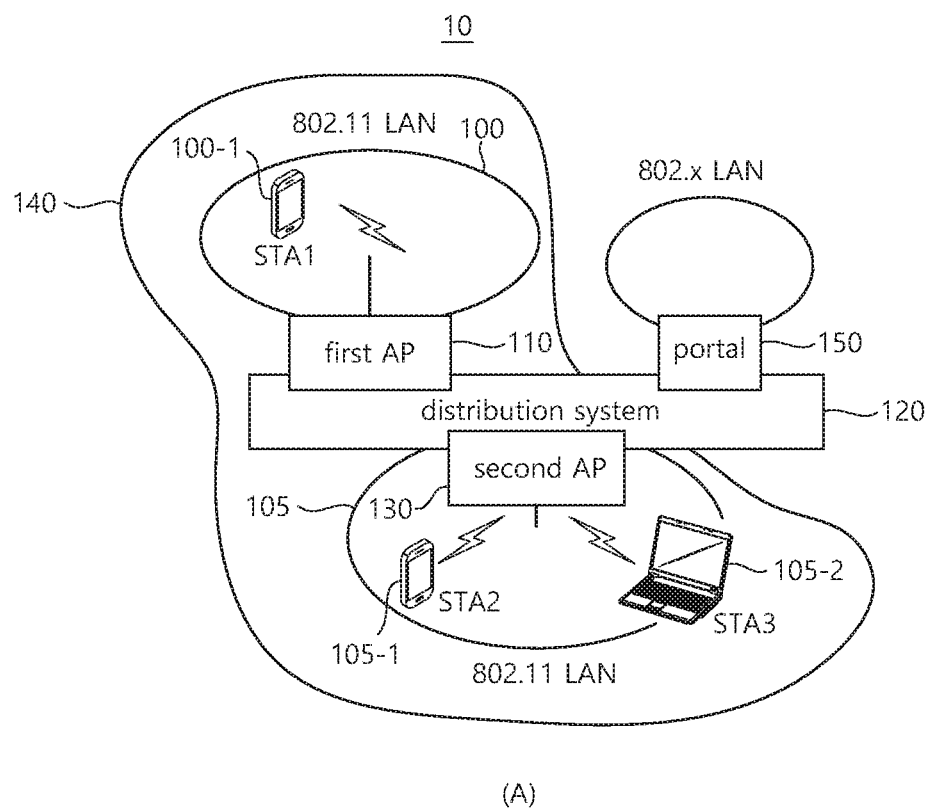
FIG. 1 a conceptual diagram showing a structure of a wireless LAN system.
Figure 1:
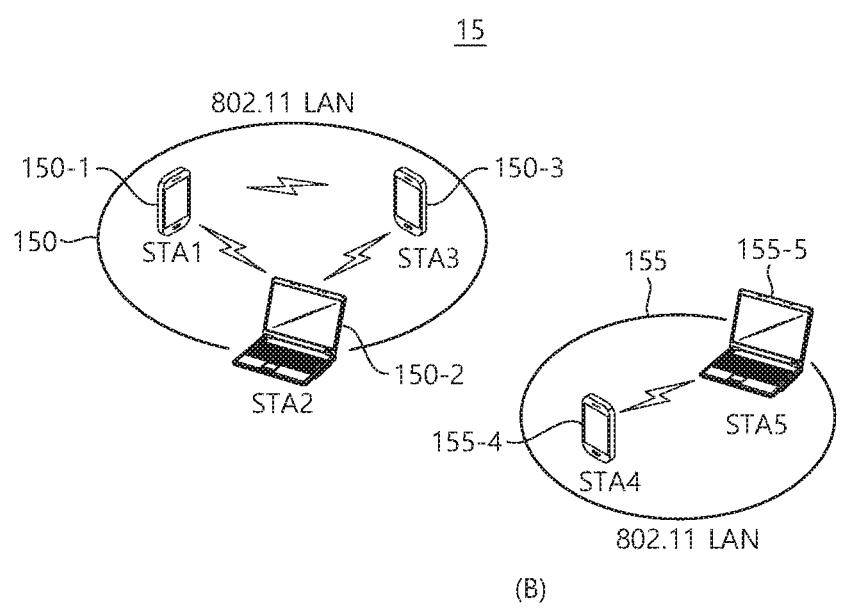

FIG. 1 is a conceptual diagram showing a structure of a wireless LAN system. FIG. 1(A) shows a structure of an infrastructure network of IEEE (Institute of Electrical and Electronic engineers) 802.11.

Referring to FIG. 1(A), the wireless system 10 shown in FIG. 1(a) may include at least one basic service set (BSS) 100 and 105. A BSS is a set of an access point (AP) and a station (STA) which can communication each other in successful synchronization with each other and does not refer to a specific area.

For example, a first BSS 100 may include a first AP 110 and a single first STA 100-1. A second BSS 105 may include a second AP 130 and one or more STAs 105-1 and 105-2.

The infrastructure BSSs 100 and 105 may include at least one STA, APs providing a distribution service, and a distribution system (DS) 120 which connects the APs.

The distribution system 120 can realize an extended service set (ESS) 140 by connecting the plurality of BSSs 100 and 105. The ESS 140 can be used as a term indicating a network realized by connecting one or more APs 110 and 130 through the distribution system 120. One or more APs included in the single ESS 140 may have the same service set identifier (SSID).

A portal 150 can serve as a bridge for connecting the wireless LAN network (IEEE 802.11) to another network (E.g., 802.X).

In the wireless LAN system having the structure shown in FIG. 1(A), a network between the APs 110 and 130 and a network between the APs 110 and 130 and the STAs 100-1, 105-1 and 105-2 can be realized.

FIG. 1(B) is a conceptual diagram showing an independent BSS. Referring to FIG. 1(B), a wireless LAN system 15 shown in FIG. 1(B) can establish a network between STAs without the APs 110 and 130 such that the STAs can perform communication, distinguished from the wireless LAN system of FIG. 1(A). A network established between STAs without the APs 110 and 130 for communication is defined as an ad-hoc network or an independent basic service set (IBSS).

Referring to FIG. 1(B), the IBSS 15 is a BSS operating in an ad-hoc mode. The IBSS does not have a centralized management entity because an APP is not included therein. Accordingly, STAs 150-1, 150-2, 150-3, 155-4 and 155-5 are managed in a distributed manner in the IBSS 15.

All STAs 150-1, 150-2, 150-3, 155-4 and 155-5 of the IBSS may be configured as mobile STAs and are not allowed to access a distributed system. All STAs of the IBSS constitutes a self-contained network.

An STA mentioned in the disclosure is an arbitrary functional medium including medium access control (MAC) conforming to regulations of IEEE (Institute of Electrical and Electronics Engineers) 802.11 and a physical layer interface with respect to a wireless medium and may be used as a meaning including both an AP and a non-AP station.

The STA mentioned in the disclosure may also be called various terms such as a mobile terminal, a wireless device, a wireless transmit/receive unit (WTRU), a user equipment (UE), a mobile station (MS), a mobile subscriber unit, and a user.

Figure 2:
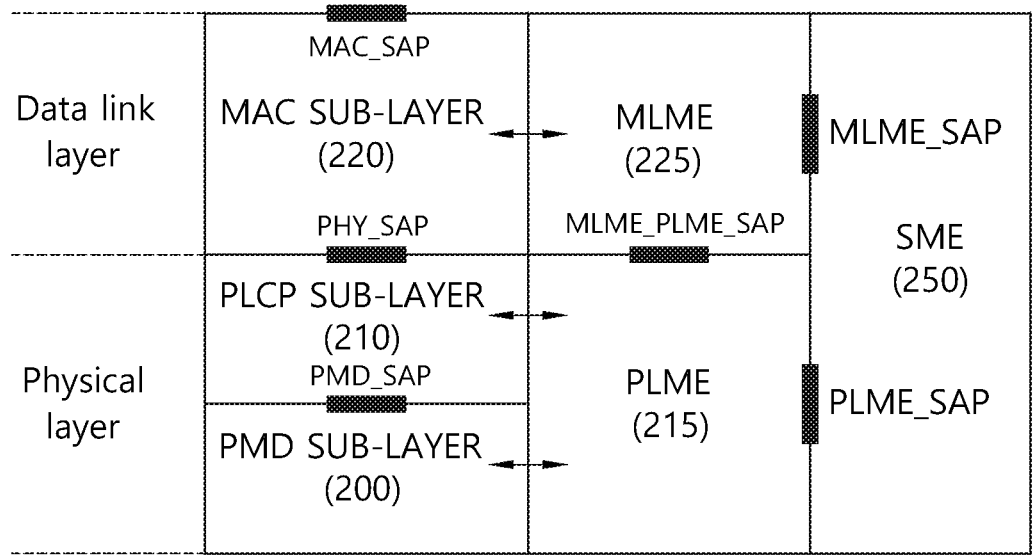
FIG. 2 is a conceptual diagram showing a hierarchical architecture of a wireless LAN system supported by IEEE 802.11.

FIG. 2 is a conceptual diagram of a hierarchical architecture of a wireless LAN system supported by IEEE 802.11. Referring to FIG. 2, the hierarchical architecture of the wireless LAN system may include a physical medium dependent (PMD) sublayer 200, a physical layer convergence procedure (PLCP) sublayer 210 and a medium access control (MAC) sublayer 220.

The PMD sublayer 200 can serve as a transport interface for transmitting and receiving data between STAs. The PLCP sublayer 210 is implemented such that the MAC sublayer 220 can operate with minimum dependency on the PMD sublayer 200.

The PMD sublayer 200, the PLCP sublayer 210 and the MAC sublayer 220 may conceptually include a management entity. For example, a manager of the MAC sublayer 220 is called a MAC layer management entity (MLME) 225. A manager of the physical layer is called a PHY layer management entity (PLME) 215.

These managers can provide interfaces for performing layer management operation. For example, the PLME 215 can be connected to the MLME 225 to perform a management operation of the PLCP sublayer 210 and the PMD sublayer 200. The MLME 225 can be connected to the PLME 215 to perform a management operation of the MAC sublayer 220.

To perform correct MAC layer operation, an STA management entity (SME) 250 may be provided. The SME 250 can be operated as an independent component in each layer. The PLME 215, the MLME 225 and the SME 250 can transmit and receive information based on primitive.

The operation in each sublayer will be briefly described below. For example, the PLCP sublayer 210 transfers a MAC protocol data unit (MPDU) received from the MAC sublayer 220 to the PMD sublayer 200 or transfers a frame from the PMD sublayer 200 to the MAC sublayer 220 between the MAC sublayer 220 and the PMD sublayer 200 according to an instruction of the MAC layer.

The PMD sublayer 200 is a sublayer of PLCP and can perform data transmission and reception between STAs through a wireless medium. An MPDU transferred from the MAC sublayer 220 is referred to as a physical service data unit (PSDU) in the PLCP sublayer 210. Although the MPDU is similar to the PSDU, an individual MPDU may differ from an individual PSDU when an aggregated MPDU corresponding to an aggregation of a plurality of MPDU is transferred.

The PLCP sublayer 210 attaches an additional field including information necessary for a transceiver of the physical layer to a PSDU in a process of receiving the PSDU from the MAC sublayer 220 and transferring the PSDU to the PMD sublayer 200. Here, the attached field may be a PLCP preamble and a PLCT header attached to the PSDU, tail bits necessary to return a convolution encoder to a zero state, and the like.

The PLCP sublayer 210 attaches the aforementioned field to the PSDU to generate a PLCP protocol data unit (PPDU) and transmits the PPDU to a reception station through the PMD sublayer 200, and the reception station receives the PPDU and acquires information necessary for data restoration from the PLCP preamble and the PLCP header to restore data.

Figure 3:
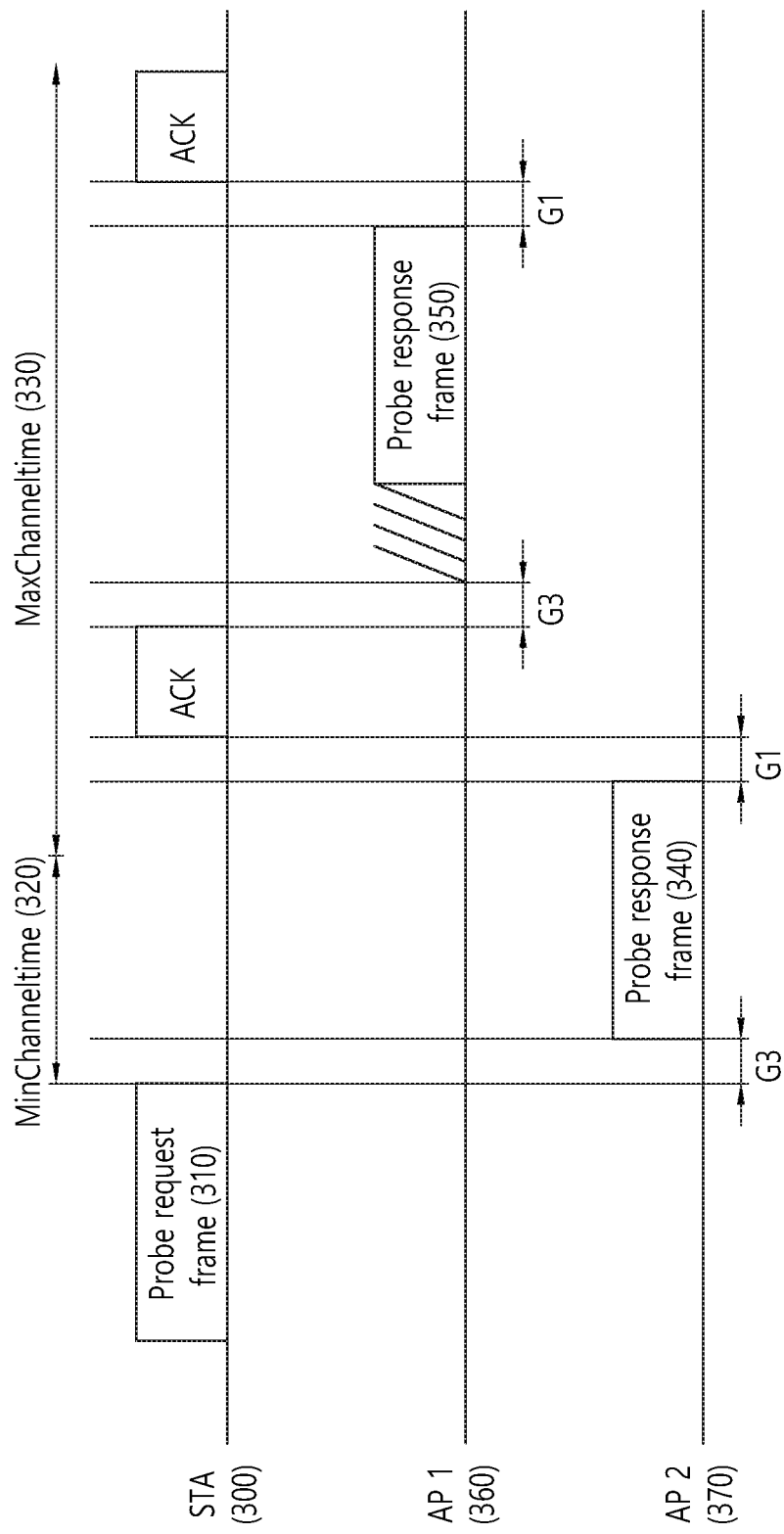
FIG. 3 is a conceptual diagram showing an active scanning procedure.

FIG. 3 is a conceptual diagram of an active scanning procedure.

Referring to FIG. 3, the active scanning procedure can be performed as follows.

(1) An STA 300 determines whether to be ready to perform a scanning procedure.

The STA 300 can perform active scanning after waiting until a probe delay time expires or specific signaling information (e.g., PHY-RXSTART.indication primitive is received.

The probe delay time is a delay generated before the STA 300 transmits a probe request frame 510 during active scanning PHY-RXSTART.indication primitive is a signal transmitted from the PHY layer to the MAC layer. PHY-RXSTART.indication primitive can be used to signal, to the MAC layer, information representing that a PLCP protocol data unit (PPDU) including a PLCP header valid in the physical layer convergence protocol (PLCP) has been received.

(2) Basic access is performed.

In 802.11 MAC layer, many STAs can share a wireless medium using, for example, a distributed coordination function (DCF) that is a contention based function. The DCF can prevent collision between STAs through a backoff method using an access protocol (carrier sense multiple access/collision avoidance (CSMA/CA)). The STA 300 can transmit the probe request frame 310 to APs 360 and 370 using a basic access method.

(3) The STA 300 can include information (e.g., service set identification (SSID)) and basic service set identification (BSSID) information) for identifying the APs 360 and 370 which is included in MLME-SCAN.request primitive in the probe request frame 310 and transmit the probe request frame 310 including the information.

A BSSID is an indicator for identifying an AP and can have a value corresponding to the MAC address of the AP. An SSID is a network name for identifying an AP which can be read by an STA operator. A BSSID and/or an SSID can be used to identify an AP.

The STA 300 can identify the APs based on the information for identifying the APs 360 and 370 which is included in MLME-SCAN.request primitive. The identified APs 360 and 370 can transmit probe response frames 350 and 340 to the STA 300. The STA 300 can unicast, multicast or broadcast the probe request frame 310 by transmitting the probe request frame 310 including SSID and BSSID information. A method of unicasting, multicasting or broadcasting the probe request frame 310 using SSID and BSSID information will be additionally described in detail with reference to FIG. 5.

For example, when an SSID list is included in MLME-SCAN.request primitive, the STA 300 can include the SSID list in the probe request frame 310 and transmit the probe request frame 310 including the SSID list. The APs 360 and 370 can receive the probe request frame 310, check SSIDs belonging to the SSID list included in the received probe request frame 310 and determine whether to transmit the probe response frames 350 and 340 to the STA 300.

(4) A probe timer is initialized to "0" and then operated.

The probe timer can be used to check a minimum channel time (MinChanneltime) 320 and a maximum channel time (MaxChanneltime) 330. The minimum channel time 320 and the maximum channel time 330 can be used to control the active scanning operation of the STA 300.

The minimum channel time 320 can be used for the STA 300 to perform an operation of changing a channel in which active scanning is performed. For example, when the STA 300 cannot receive the probe response frames 340 and 350 until the probe timer reaches the minimum channel time 320, the STA 300 can change scanning channels and perform scanning in another channel. When the STA 300 receives the probe response frame 350 before the probe timer reaches the minimum channel time 320, the STA 300 can process the received probe response frames 340 and 350 when the probe timer reaches the maximum channel time 330.

The STA 300 can search for PHY-CCA.indication primitive until the probe timer reaches the minimum channel time 320 to determine whether other frames (e.g., the probe response frames 340 and 350 have been received before the minimum channel time 320.

PHY-CCA.indication primitive can carry information about a medium state from the physical layer to the MAC layer. PHY-CCA.indication primitive can indicate the state of the current channel using a channel state parameter that is "busy" when a channel is not available and "idle" when the channel is available. The STA 300 can determine that the probe response frames 340 and 350 received thereby are present when the searched PHY-CCA.indication indicates "busy" and determine that the probe response frames 340 and 350 received thereby are not present when the searched PHY-CCA.indication indicates "idle".

When PHY-CCA.indication indicating "idle" is searched, the STA can set a network allocation vector (NAV) to 0 and scan the next channel. When PHY-CCA.indication indicating "busy" is searched, the STA 300 can process the probe response frames 340 and 350 received after the probe timer reaches the maximum channel time 330. After processing the received probe response frames 340 and 350, the STA 300 can set the NAV to 0 and scan the next channel.

Hereinafter, PHY-CCA.indication according to the disclosure can be applied to all frames transmitted to the physical layer as well as frame response frames.

(5) When all channels included in a channel list ChannelList are scanned, MLME can signal MLME-SCAN.confirm primitive. MLME-SCAN.confirm primitive can include BSSDescriptionSet including all pieces of information acquired in the scanning procedure.

When the STA 300 uses an active scanning method, the STA 300 needs to monitor whether the PHY-CCA.indication parameter is busy until the probe timer reaches the minimum channel time.

Detailed information included in the aforementioned MLME-SCAN.request primitive is as follows. To perform scanning, an STA can receive MLME-SCAN.request primitive from the MLME. MLME-SCAN.request primitive is a primitive generated by the SME. MLME-SCAN.request primitive can be used to determine whether another BSS to be connected to the STA is present.

Specifically, MLME-SCAN.request primitive can include information such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, and VendorSpecificInfo.

A request parameter included in MLME-SCAN.request-.primitive can be used for a response STA to determine whether to transmit a probe response frame. The request parameter can include information for requesting inclusion of information of another BSS in a probe response frame. Further, the request parameter may include a report request field, a delay reference field, and a maximum delay limit field.

The report request field is information for requesting inclusion of information of another BSS in a probe response frame, the delay reference field includes information about a delay type applied as a response to a probe request frame, and the maximum delay limit field may include information maximum access delay information on a delay type.

In addition, the request parameter may include a minimum data rate field and/or a received signal strength limit field. The minimum data rate field includes information about a lowest total data rate in transmission of an MSDU or an A-MSDU. The received signal strength limit field may further include information about a limit value of a signal necessary for response of a probe request frame receiver.

Figure 4:
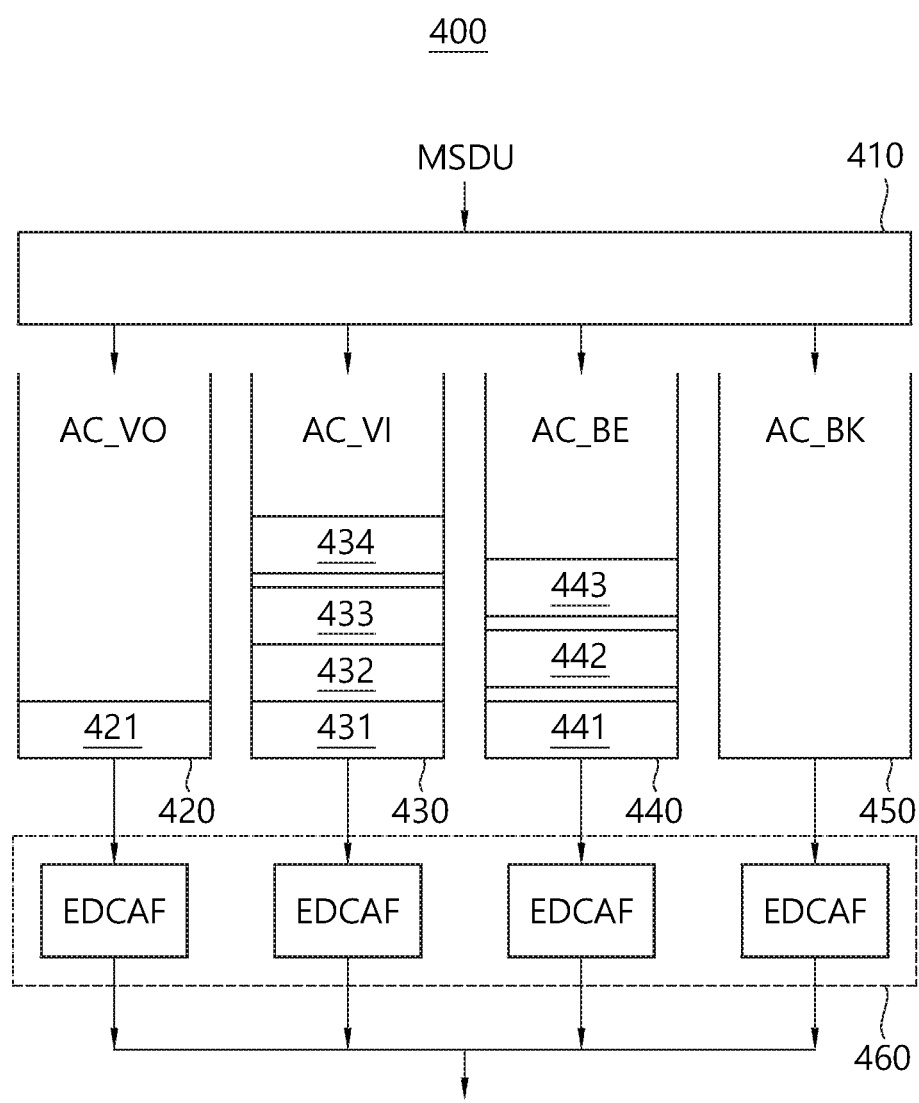
FIG. 4 is a conceptual diagram of an STA supporting EDCA in a wireless LAN system.

FIG. 4 is a conceptual diagram of an STA supporting EDCA in a wireless LAN system.

An STA (or AP) that performs channel access based on enhanced distributed channel access (EDCA) in a wireless LAN system can perform channel access according to a plurality of user priority orders defined in advance for traffic data.

For transmission of a quality of service (QoS) data frame based on a plurality of user priority orders, EDCA can be defined as four access categories (AC) AC_BK (background), AC_BE (best effort), AC_VI (video) and AC_VO (voice).

An STA that performs channel access based on EDCA can map traffic data such as a MAC service data unit (MSDU) arriving at the medium access control (MAC) layer from a logical link control (LLC) layer as shown in Table 1. Table 1 is an exemplary table showing mapping between user priority and AC.

TABLE 1

| Priority | User priority | AC (Access Category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and an AC parameter can be defined for each AC. A plurality of user priority orders can be realized based on different AC parameter values set for ACs.

An STA that performs channel access based on EDCA can use AIFS (arbitration interframe space)[AC], CWmin[AC] and CWmax[AC] respectively instead of DIFS (DCF interframe space), CWmin and CWmax that are parameters based on a distributed coordination function (DCF) when the STA performs a backoff procedure for transmitting a frame belonging to each AC.

For reference, an example of a parameter default value corresponding to each AC is as shown in Table 2.

TABLE 2

| AC | CWmin [AC] | CWmax [AC] | AIFS [AC] | TXOP limit [AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

An EDCA parameter used for the backoff procedure per AC can be set to a default value or loaded in a beacon frame and transmitted from an AP to each STA. Priority increases as the values of AIFS[AC] and CWmin[AC] decrease, and thus channel access delay decreases to allow a larger amount of bands to be used in a given traffic environment.

An EDCA parameter set element may include information about channel access parameters (e.g., AIFS [AC], CWmin [AC] and CWmax[AC]) for each AC.

When collision between STAs occurs while an STA transmits a frame, an EDCA backoff procedure for generating a new backoff counter is similar to a conventional DCF backoff procedure.

An EDCA backoff procedure differentiated for each AC can be performed based on EDCA parameters individually set per AC. The EDCA parameters can be important means used to differentiate channel access of traffic of various user priority orders.

Appropriate setting EDCA parameter values defined per AC can optimize network performance and improve transmission effects according to priority of traffic. Accordingly, an AP can perform management and adjustment of EDCA parameters in order to secure fair medium access of all STAs participating in a network.

In the disclosure, user priority predefined (or preassigned) for traffic data (or traffic) may be referred to as a traffic identifier (TID).

Traffic data transmission priority can be determined based on user priority. Referring to Table 1, a TID of traffic data having highest user priority can be set to "7". That is, traffic data having a TID set to "7" can be understood as traffic having highest transmission priority.

Referring to FIG. 4, one STA (or AP) 400 may include a virtual mapper 410, transmission queues 420 to 450, and a virtual collision handler 460.

The virtual mapper 410 shown in FIG. 4 can serve to map an MSDU received from an LLC layer to a transmission queue corresponding to each AC according to Table 1.

The plurality of transmission queues 420 to 450 shown in FIG. 4 can serve as individual EDCA contention entities for channel access to a wireless medium in one STA (or AP).

For example, the AC VO type transmission queue 420 in FIG. 4 may include a single frame 421 for a second STA (not shown). The AC VI type transmission queue 430 may include three frames 431 to 433 for a first STA (not shown) and one frame 434 for a third STA (not shown) according to order of transmission to the physical layer.

The AC BE type transmission queue 440 in FIG. 4 may include one frame 441 for the second STA (not shown), one frame 442 for the third STA (not shown) and one frame 443 for the second STA (not shown) according to order of transmission to a physical layer. For example, the AC BE type transmission queue 450 may not include a frame to be transmitted to the physical layer.

For example, internal backoff values for the AC VO type transmission queue 420, the AC VI type transmission queue 430, the AC BE type transmission queue 440 and the AC BK type transmission queue 450 can be individually calculated based on mathematical expression 1 below and a channel access parameter set (i.e., AIFS [AC], CWmin[AC] and CWmax[AC] in Table 2) for each AC.

The STA 400 can perform a backoff procedure based on internal backoff values for the transmission queues 420, 430, 440 and 450. In this case, a transmission queue for which the internal backoff procedure is completed first can be understood as a transmission queue corresponding to a primary AC.

A frame included in the transmission queue corresponding to the primary AC can be transmitted to another entity (e.g., another STA or AP) in a TXOP period for transmission opportunity (TXOP). If two or more ACs which have ended the backoff procedure are present, collision between ACs can be adjusted according to a function (EDCA function (EDCAF)) included in the virtual collision handler 460.

That is, collision between ACs occurs, a frame included in an AC having higher priority can be transmitted first. Further, other ACs can increase contention window values and update values set to the backoff count.

When a certain frame buffered in the transmission queue of the primary AC is transmitted, the STA can transmit the next frame in the same AC for a TXOP period and determine whether ACK for the frame can be received. In this case, the STA attempts to transmit the next frame after an SIFS time interval.

A TXOP limit value may be set to a default value in an AP and an STA or a frame related to the TXOP limit value may be transmitted from the AP to the STA. If the size of a data frame to be transmitted exceeds the TXOP limit value, the STA can fragment the frame into a plurality of small frames. Then, the fragmented frames can be transmitted within a range in which they do not exceed the TXOP limit value.

Figure 5:
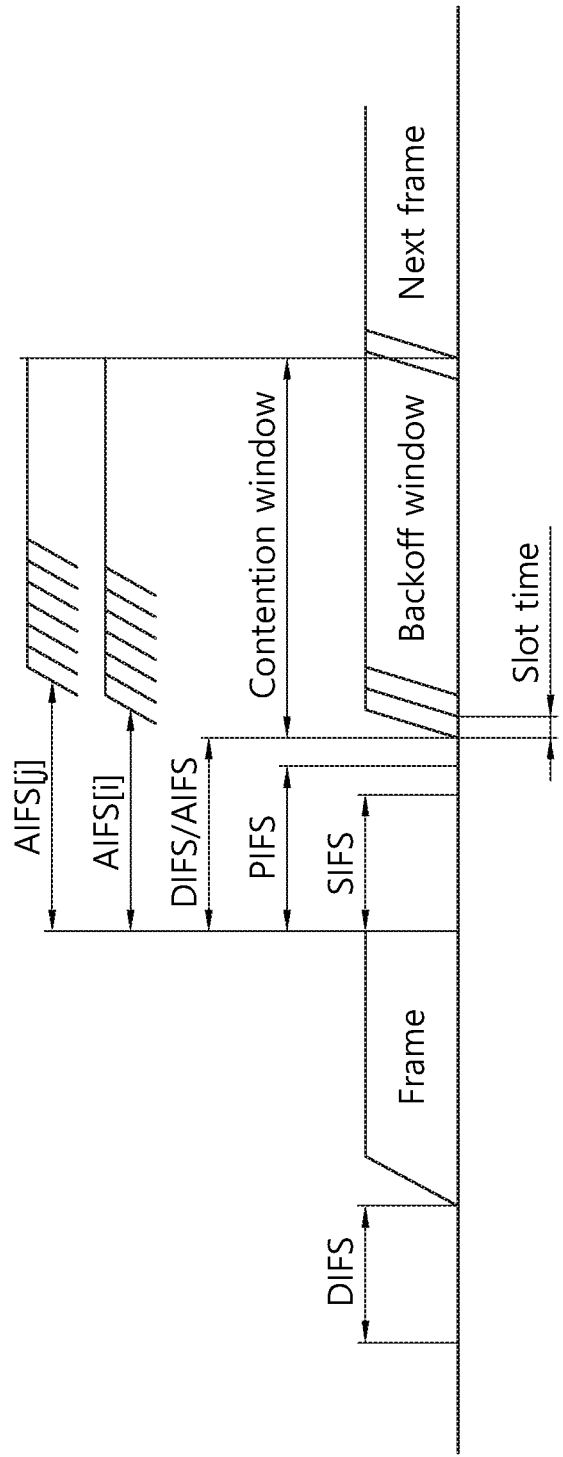
FIG. 5 is a conceptual diagram showing a backoff procedure according to EDCA.

FIG. 5 is a conceptual diagram showing a backoff procedure according to EDCA.

STAs can share a wireless medium based on a distributed coordination function (DCF) that is a contention based function. The DCF is an access protocol for coordinating collision between STAs and can use carrier sense multiple access/collision avoidance (CSMA/CA).

When it is determined that a wireless medium is not used for a DCF interframe space (DIFS) according to the DCF (i.e., in a state in which the wireless medium is idle), an STA can acquire rights to transmit internally determined MPDUs through the wireless medium. For example, the internally determined MPDUs may be understood as frames included in the transmission queue of the primary AC mentioned through FIG. 4.

When the wireless medium is determined to be used by another STA in the DIFS according to the DCF (i.e., in a state in which the wireless medium is busy), the STA can wait until the wireless medium becomes an idle state in order to acquire rights to transmit internally determined MPDUs through the wireless medium.

Subsequently, the STA can defer channel access by the DIFS based on a time at which the wireless medium switches to an idle state. Thereafter, the STA can wait by a contention window (CW) set in a backoff counter.

To perform the backoff procedure according to EDCA, each STA can set a backoff value arbitrarily selected in the CW to the backoff counter. For example, to perform the backoff procedure according to EDCA, a backoff value set in the backoff counter of each STA can be associated with an internal backoff value used in an internal backoff procedure for determining a primary AC of each STA.

In addition, a backoff value set in the backoff counter of each STA may be a value newly set in the backoff counter of each STA based on mathematical expression 1 below and the channel access parameter set (i.e., AIFS [AC], CWmin [AC] and CWmax[AC] in Table 2) for each AC for the transmission queue of the primary AC of each STA.

In the disclosure, a time representing a backoff value selected by each STA in units of slot time can be understood as a backoff window of FIG. 5.

Each STA can perform a countdown operation of reducing the backoff window set in the backoff counter in units of slot time. An STA for which a shortest backoff window is set among a plurality of STAs can acquire transmission opportunity (TXOP) that is the right to occupy a wireless medium.

The remaining STAs can stop the countdown operation during a time for TXOP. The remaining STAs can wait until the time for TXOP ends. After the time for TXOP ends, the remaining STAs can resume the stopped countdown operation in order to occupy the wireless medium.

According to this DCF based transmission method, collision between STAs which may occur when a plurality of STAs simultaneously transmits frames can be prevented. However, a channel access technique using the DCF does not have the concept of transmission priority (i.e., user priority). That is, QoS of traffic to be transmitted by an STA cannot be guaranteed when the DCF is used.

To solve this problem, a hybrid coordination function (HCF) that is a new coordination function has been defined in 802.11e. The newly defined HCF has more enhanced performance than channel access performance of the DCF. The HCF can use two channel access techniques, HCF controlled channel access (HCCA) and enhanced distributed channel access (EDCA), together for the purpose of QoS improvement.

Referring to FIG. 5, it can be assumed that an STA attempts to transmit buffered traffic data. User priority set in each piece of traffic data can be differentiated as shown in FIG. 1. The STA can include output queues of four types AC_BK, AC_BE, AC_VI and AC_VO mapped to user priority of Table 1.

The STA can transmit the traffic data based on an arbitration interframe space (AFID) instead of the DIFS.

Hereinafter, a wireless terminal (i.e., STA) may be a device capable of supporting both a wireless LAN system and a cellular system in embodiments of the disclosure. That is, a wireless terminal can be interpreted as a UE that supports a cellular system or an STA that supports a wireless LAN system.

For smooth description of the disclosure, inter-frame spacing mentioned in 802.11 is described. For example, an inter-frame spacing (IFS) may be a reduced interframe space (RIFS), a short interframe space (SIFS), a PCF interframe space (PIFS), a DCF interframe space (DIFS), an arbitration interframe space (AIFS) or an extended interframe space (EIFS).

The IFS can be determined according to attributes specified by the physical layer of an STA irrespective of a bit rate of the STA. IFSs other than the AIFS can be understood as values fixed for each physical layer.

The AIFS can be understood as a value corresponding to four types of transmission queues mapped to user priority as shown in Table 2.

SIFS has a shortest time gap among the aforementioned IFSs. Accordingly, this can be used when an STA that occupies a wireless medium needs to maintain occupation of the medium in a period in which a frame exchange sequence is executed without being disturbed by other STAs.

That is, priority can be given to completion of a frame exchange sequence in progress by using a shortest gap between transmissions in the frame exchange sequence. Further, an STA that accesses a wireless medium using an SIFS can immediately start transmission on an SIFS boundary without determining whether the medium is busy.

An SIFS duration for a specific physical layer can be defined by aSIFSTime parameter. For example, an SIFS value is 16 µs in the physical layers of IEEE 802.11a, IEEE 802.11g, IEEE 802.11n and IEEE 802.11ac.

The PIFS can be used to provide higher priority next to the SIFS to an STA. That is, the PIFS can be used to acquire priority for accessing a wireless access.

The DIFS can be used by an STA that transmits a data frame (MPDU) and a management frame (MPDU) based on the DCF. The STA can transmit frames upon determining that a medium is idle through a carrier sense (CS) mechanism after a received frame and backoff time expire.

Figure 6:
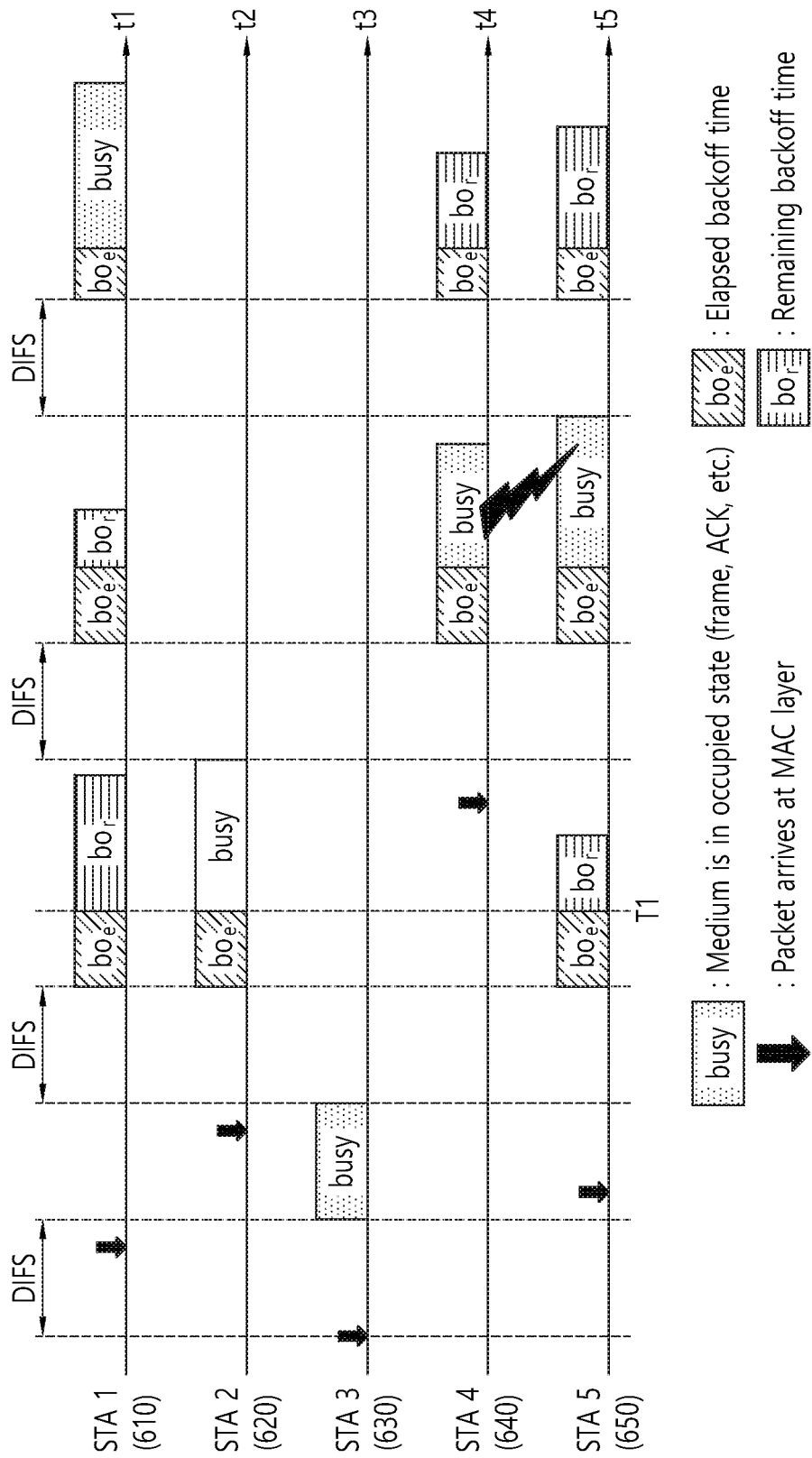
FIG. 6 is a diagram for describing a frame transmission procedure in a wireless LAN system.

FIG. 6 is a diagram for describing a frame transmission procedure in a wireless LAN system.

Referring to FIGS. 5 and 6, STAs 610, 620, 630, 640 and 650 of the wireless LAN system can individually set backoff values for performing a backoff procedure according to EDCA to backoff counters thereof.

Each of the STAs 610, 620, 630, 640 and 650 can attempt transmission after waiting for a time (i.e., the backoff window in FIG. 5) representing the set backoff time in units of slot time.

In addition, the STAs 610, 620, 630, 640 and 650 can reduce the backoff window in units of slot time through a countdown operation. The countdown operation for channel access to a wireless medium can be individually performed by each STA.

Each STA can individually set a backoff time (random backoff time Tb[i]) corresponding to the backoff window to the backoff counter thereof. Specifically, the backoff time Tb[i] is a pseudo-random integer value and can be calculated based on mathematical expression 1 below.

$$T_b[i]=\text{Random}(i)\times\text{SlotTime} \quad \text{[Mathematical expression 1]}$$

In mathematical expression 1, Random(i) is a function that uses uniform distribution and generates a random integer between "0" and CW[i]. CW[i] can be understood as a contention window selected between a minimum contention window CWmin[i] and a maximum contention window CWmax[i].

For example, the minimum contention window CWmin[i] and the maximum contention window CWmax[i] may respectively correspond to default values CWmin[AC] and CWmax[AC] in Table 2.

For example, when CW[i] is set to CWmin[i] for initial channel access, a random integer value between "0" and CWmin[i] can be selected according to Random(i). A random integer value selected according to Random(i) may be referred to as a backoff value in the disclosure.

In mathematical expression 1, i can be understood to correspond to user priority in Table 1. That is, traffic buffered in an STA can be understood to correspond to one of AC_VO, AC_VI, AC_BE and AC_BK in Table 1 based on a value set to i in mathematical expression 1.

SlotTime in mathematical expression 1 can be used to provide a sufficient time such that a preamble of a transmission STA can be detected by a neighbor STA. SlotTime in mathematical expression 1 can be used to define the aforementioned PFIS and DIFS. For example, SlotTime may be 9 μs.

For example, when user priority i is "7", an initial backoff time Tb[7] for a transmission queue of AC_VO type may be a time representing a backoff value selected between 0 and CWmin[AC_VO] in units of slot time (SlotTime).

When collision between STAs has occurred according to a backoff procedure (or when an ACK frame for a transmitted frame has not been received), an STA can newly calculate an increased backoff time Tb[l]' based on mathematical expression 2 below.

$$CW_{new}[i]=((CW_{old}[i]+1)\times PF)-1 \quad \text{[Mathematical expression 2]}$$

Referring to mathematical expression 2, a new contention window $CW_{new}[i]$ can be calculated based on a previous window $CW_{old}[i]$. PF in mathematical expression 2 can be calculated according to a procedure defined in IEEE 802.11e. For example, PF in mathematical expression 2 may be set to "2".

In the present embodiment, the increased backoff time Tb[i]' can be understood as a time representing a random integer (i.e., backoff value) selected between 0 and the new contention window $CW_{new}[i]$ in units of slot times.

If the new contention window $CW_{new}[i]$ reaches or exceeds CWmax[i], $CW_{new}[i]$ can be maintained until $CW_{new}[i]$ is reset to CWmin[i] after successful MPDU transmission.

CWmin[i], CWmax[i], AIFS[i] and PF mentioned in description with reference to FIG. 6 can be signaled from an AP through a QoS parameter set element that is a management frame. CWmin[i], CWmax[i], AIFS[i] and PF may be values preset by an AP and an STA.

Referring to FIG. 6, the horizontal axis t1 to t5 for the first to fifth STAs 610 to 650 can represent a time axis. Further, the vertical axis for the first to fifth STAs 610 to 650 can represent a transmission backoff time.

Referring to FIGS. 5 and 6, when a specific medium switches from a occupied (or busy) state to an idle state, the plurality of STAs can attempt data (or frame) transmission.

Here, as a method for minimizing collision between STAs, each STA can select a backoff time Tb[i] in mathematical expression 1, wait for a slot time corresponding to the selected backoff time and then attempt transmission.

When a backoff procedure starts, each STA can count down an individually selected backoff counter time in units of slot time. Each STA can continuously monitor the medium during countdown.

If the wireless medium in an occupied state is monitored, each STA can stop countdown and wait. If the wireless medium in an idle state is monitored, each STA can resume countdown.

Referring to FIG. 6, when a frame for the third STA 630 arrives at the MAC layer of the third STA 630, the third STA 630 can check whether the medium is idle for a DIFS. When the medium is determined to be idle for the DIFS, the third STA 630 can transmit a frame to an AP (not shown). Although the interframe space (IFS) is illustrated as a DIFS in FIG. 6, the disclosure is not limited thereto.

While the third STA 630 transmits the frame, the remaining STAs can check an occupied state of the medium and wait for a frame transmission period. Frames may arrive at the MAC layers of the first, second and fifth STAs 610, 620 and 650. When it is confirmed that the medium is idle, each STA can wait for the DIFS and then count down an individual backoff time selected by each STA.

FIG. 6 shows a case in which the second STA 620 selects the shortest backoff time and the first STA 610 selects the longest backoff time. At a time T1 at which a backoff procedure for the backoff time selected by the second STA 620 ends and frame transmission starts, the remaining backoff time of the fifth STA 650 is shorter than the remaining backoff time of the first STA 610.

When the medium is occupied by the second STA 620, the first STA 610 and the fifth STA 650 can suspend the backoff procedure and wait. Then, when occupation of the medium by the second STA 620 ends (i.e., the medium becomes an idle state again), the first STA 610 and the fifth STA 650 can wait for the DIFS.

Subsequently, the first STA 610 and the fifth STA 650 can resume the backoff procedure based on the suspended remaining backoff time. In this case, the fifth STA 650 can complete the backoff procedure prior to the first STA 610 because the remaining backoff time of the fifth STA 650 is shorter than the remaining backoff time of the first STA 610.

Referring to FIG. 6, when the medium is occupied by the second STA 620, a frame for the fourth STA 640 can arrive at the MAC layer of the fourth STA 640. When the medium switches to an idle state, the fifth STA 640 can wait for the DIFS. Subsequently, the fourth STA 640 can count down the backoff time selected by the fourth STA 640.

Referring to FIG. 6, the remaining backoff time of the fifth STA 650 may accidentally coincide with the backoff time of the fourth STA 640. In this case, collision between the fourth STA 640 and the fifth STA 650 may occur. When collision between the STAs occurs, both the fourth STA 640 and the fifth STA 650 cannot receive ACK and may fail in data transmission.

Accordingly, the fourth STA 640 and the fifth STA 650 can individually calculate new contention windows $CW_{new}$[i] according to mathematical expression 2. Then, the fourth STA 640 and the fifth STA 650 can individually count down backoff times newly calculated according to mathematical expression 2.

Meanwhile, when the medium is in an occupied state according to transmission of the fourth STA 640 and the fifth STA 650, the first STA 610 can wait. When the medium becomes idle, the first STA 610 can wait for the DIFS and then resume backoff counting. After the elapse of the remaining backoff time of the first STA 610, the first STA 610 can transmit a frame.

The CSMA/CA mechanism can also include virtual carrier sensing in addition to physical carrier sensing through which an AP and/or an STA directly sense a medium.

Virtual carrier sensing is for supplementing a problem that may be generated in medium access, such as a hidden node problem. For virtual carrier sensing, MAC of a WLAN system uses a network allocation vector (NAV). The NAV is a value by which a remaining time until a medium becomes available is indicated by an AP and/or an STA which are using the medium or have the right to use the medium to other APs and/or STAs.

Accordingly, a value set to the NAV corresponds to a period in which a medium is scheduled to be used by an AP and/or an STA which transmit a corresponding frame, and an STA that receives the NAV value is prohibited from accessing the medium during the period. The NAV can be set according to the value of a duration field of an MAC header of a frame, for example.

Figure 7:
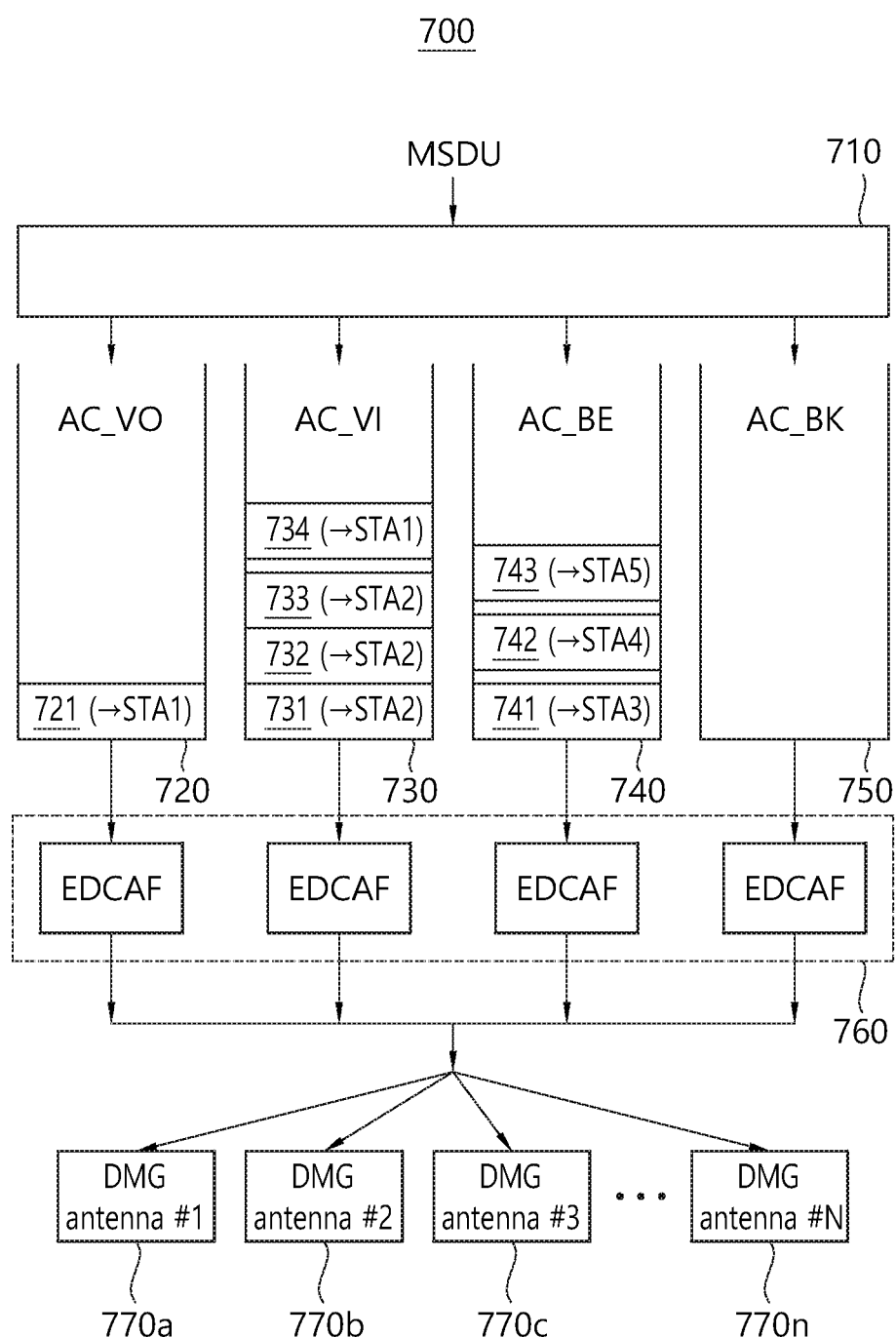
FIG. 7 is a conceptual diagram of a wireless terminal transmitting frames in a wireless LAN system.

FIG. 7 is a conceptual diagram of a wireless terminal that transmits a frame in a wireless LAN system.

Referring to FIG. 7, a wireless terminal 700 according to the present embodiment may include a virtual mapper 710, a plurality of transmission queues 720 to 750, a virtual collision handler 760 and a plurality of directional antenna modules 770a to 770n.

Referring to FIGS. 1 to 7, description of the virtual mapper 710, the plurality of transmission queues 720 to 750 and the virtual collision handler 760 can be understood as description of the virtual mapper 410, the plurality of transmission queues 420 to 450 and the virtual collision handler 460 of FIG. 4.

According to the embodiment of FIG. 7, the wireless terminal 700 may have an internal structure in which a set of transmission queues 720, 730, 740 and 750 is associated with the plurality of directional antenna modules 770a and 770n.

A directional multi-gigabit (DMG) antenna mentioned in the disclosure may include a plurality of physical antennas. Further, the DMG antenna mentioned in the disclosure can be understood as a set of a plurality of antennas physically (or logically) arranged in one (or more) direction.

For concise description, the first directional antenna module 770a may include a first DMG antenna associated with a first user terminal (not shown) and the second directional antenna module 770b may include a second DMG antenna associated with a second user terminal (not shown).

In addition, the third directional antenna module 770c may include a third DMG antenna associated with a third user terminal (not shown) and the n-th directional antenna module 770n (n is a natural number) may include an N-th DMG antenna associated with an N-th user terminal (not shown).

Hereinafter, it is assumed that the wireless terminal 700 of FIG. 7 includes five directional antenna modules 770a to 770e. For example, the wireless terminal 700 of FIG. 7 can associate a plurality of data frames 721, 731 to 734 and 741 to 743 with the plurality of directional antenna modules 770a to 770n based on receive address (RA) information set in the plurality of data frames 721, 731 to 734 and 741 to 743.

The first data frame 721 can be buffered in the AC VO type transmission queue 720. For example, the first data frame 721 can be understood as an MPDU including RA information indicating the first user terminal (not shown).

The second to fifth data frames 731 to 734 can be buffered in the AC VI type transmission queue 730. For example, the second to fourth data frames 731, 732 and 733 can be understood as an MPDU including RA information indicating the second user terminal (not shown). For example, the fifth data frame 734 can be understood as an MPDU including RA information indicating the first user terminal (not shown).

The sixth to eighth data frames 741 to 743 can be buffered in the AC BE type transmission queue 740. For example, the sixth data frame 741 can be understood as an MPDU including RA information indicating the third user terminal (not shown).

For example, the seventh data frame 742 can be understood as an MPDU including RA information indicating the fourth user terminal (not shown). For example, the eighth data frame 743 can be understood as an MPDU including RA information indicating the fifth user terminal (not shown).

The plurality of data frames included in the transmission queues mentioned in the description with reference to FIG. 7 are merely an example and the disclosure is not limited thereto.

The data frames buffered in the plurality of transmission queues according to the present embodiment can be transmitted through the directional antenna modules 770a to 770n according to RA information included each data frames.

For example, the first and fifth data frames 721 and 734 can be transmitted through the first directional antenna module 770a. The second to fourth data frames 731 to 733 can be transmitted through the second directional antenna module 770b.

The sixth data frame 741 can be transmitted through the third directional antenna module 770c. The seventh data frame 742 can be transmitted through the fourth directional antenna module 770d. The eighth data frame 743 can be transmitted through the fifth directional antenna module 770e.

A conventional wireless terminal can perform an omnidirectional clear channel assessment (CCA) procedure. Specifically, a conventional wireless terminal can determine the state of a wireless medium by comparing power levels of signals received from the physical layer of a wireless terminal with a preset threshold level for a predetermined time (e.g., DIFS) in an omnidirectional way.

For example, if the average power level of signals received from the physical layer is lower than the threshold level, the state of the wireless medium can be determined to be idle. If the average power level of signals received from the physical layer is higher than the threshold level, the state of the wireless medium can be determined to be busy.

The wireless terminal 700 according to the present embodiment can cover a plurality of directions associated with the plurality of directional antenna modules 770*a* to 770*n* in a directional way. Specifically, the wireless terminal 700 can perform an individual directional CCA procedure on a plurality of radio channels corresponding to a plurality of directions for a predetermined time.

That is, the wireless terminal 700 can individually determine states of a plurality of radio channels associated with the plurality of directional antenna modules 770*a* to 770*n* for a plurality of user terminals (not shown).

Hereinafter, a CCA operation simultaneously performed by the wireless terminal according to the present embodiment for a plurality of directions can be mentioned as a directional CCA procedure.

Each of the plurality of directional antenna modules 770*a* to 770*n* can be associated with a radio channel in a specific direction for each user terminal (not shown).

The wireless terminal according to the present embodiment can simultaneously perform a plurality of individual directional CCA procedures in a directional way. That is, a first radio channel may be determined to be busy through a first directional CCA procedure for a first direction among the plurality of directions, and a second radio channel may be determined to be idle through a second directional CCA procedure for a second direction.

Similarly, an N-th radio channel in an N-th direction for an N-th user terminal (not shown) may be determined to be idle (or busy) through a directional CCA procedure.

The wireless terminal according to the present embodiment can transmit data (or data frames) included in a transmission queue of a primary AC based on at least one directional antenna module associated with at least one radio channel determined to be idle.

In addition, the wireless terminal according to the present embodiment can transmit data frames included in the transmission queue of the primary AC and data (or data frames) included in a transmission queue of a secondary AC together based on at least one directional antenna module associated with at least one radio channel determined to be idle.

Furthermore, the plurality of directional antenna modules 770*a* to 770*n* can be used to receive radio signals transmitted from other wireless terminals although it is not mentioned in the description related to FIG. 7.

Further, the internal structure of the wireless terminal shown in FIG. 7 is merely an example and the wireless terminal of the disclosure may be realized based on a structure in which a set of a plurality of transmission queues corresponds to a plurality of antenna modules.

Figure 8:
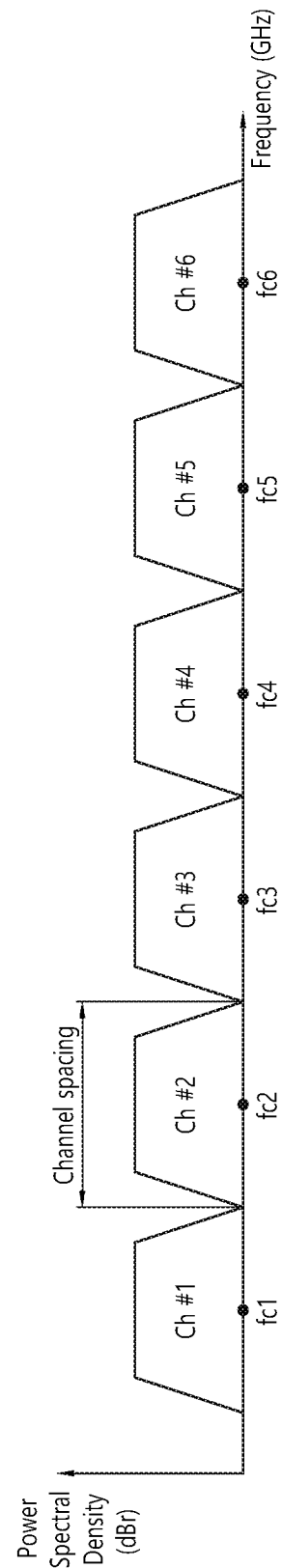
FIG. 8 is a diagram showing channelization of radio channels for transmitting frames in a wireless LAN system.

FIG. 8 is a diagram showing channelization of a wireless channel for transmitting frames in a wireless LAN system.

The horizontal axis of FIG. 8 represents a frequency (GHz) for 60 GHz. The vertical axis of FIG. 8 represents a relative signal level (dBr) with respect to maximum spectral density.

Referring to FIG. 8, first to sixth channels ch #1 to ch #6 can be allocated in order to support operation at 60 GHz for the wireless terminal according to the present embodiment. For example, a channel spacing for the first to sixth channels ch #1 to ch #6 may be 2,160 MHz.

A channel center frequency for each of the first to sixth channels ch #1 to ch #6 according to the present embodiment can be defined based on mathematical expression 3 below. For example, a channel starting frequency may be 56.16 GHz.

channel center frequency=channel starting frequency+channel spacing×channel number [Mathematical expression 3]

A first channel center frequency fc1 for the first channel ch #1 may be 58.32 GHz according to mathematical expression 3. For example, the first channel ch #1 in FIG. 8 may be defined between 57.24 GHz and 59.40 GHz.

A second channel center frequency fc2 for the second channel ch #2 may be 60.48 GHz according to mathematical expression 3. For example, the second channel ch #2 in FIG. 8 may be defined between 59.40 GHz and 61.56 GHz.

A third channel center frequency fc3 for the third channel ch #3 may be 62.64 GHz according to mathematical expression 3. For example, the third channel ch #3 in FIG. 8 may be defined between 61.56 GHz and 63.72 GHz.

A fourth channel center frequency fc4 for the fourth channel ch #4 may be 64.80 GHz according to mathematical expression 3. For example, the fourth channel ch #4 in FIG. 8 may be defined between 63.72 GHz and 65.88 GHz.

A fifth channel center frequency fc5 for the fifth channel ch #5 may be 66.96 GHz according to mathematical expression 3. For example, the fifth channel ch #5 in FIG. 8 may be defined between 65.88 GHz and 68.04 GHz.

A sixth channel center frequency fc6 for the sixth channel ch #6 may be 69.12 GHz according to mathematical expression 3. For example, the sixth channel ch #6 in FIG. 8 may be defined between 68.04 GHz and 70.2 GHz.

Channelization and channel numbering mentioned in the disclosure are described in more detail in section 19.3.15 of IEEE Draft P802.11-REVmc™/D8.0 disclosed on August 2016 and sections 21.3.1 and 21.3.2 and Annex E of IEEE Std 802.11ad™ disclosed on December 2012.

Figure 9:
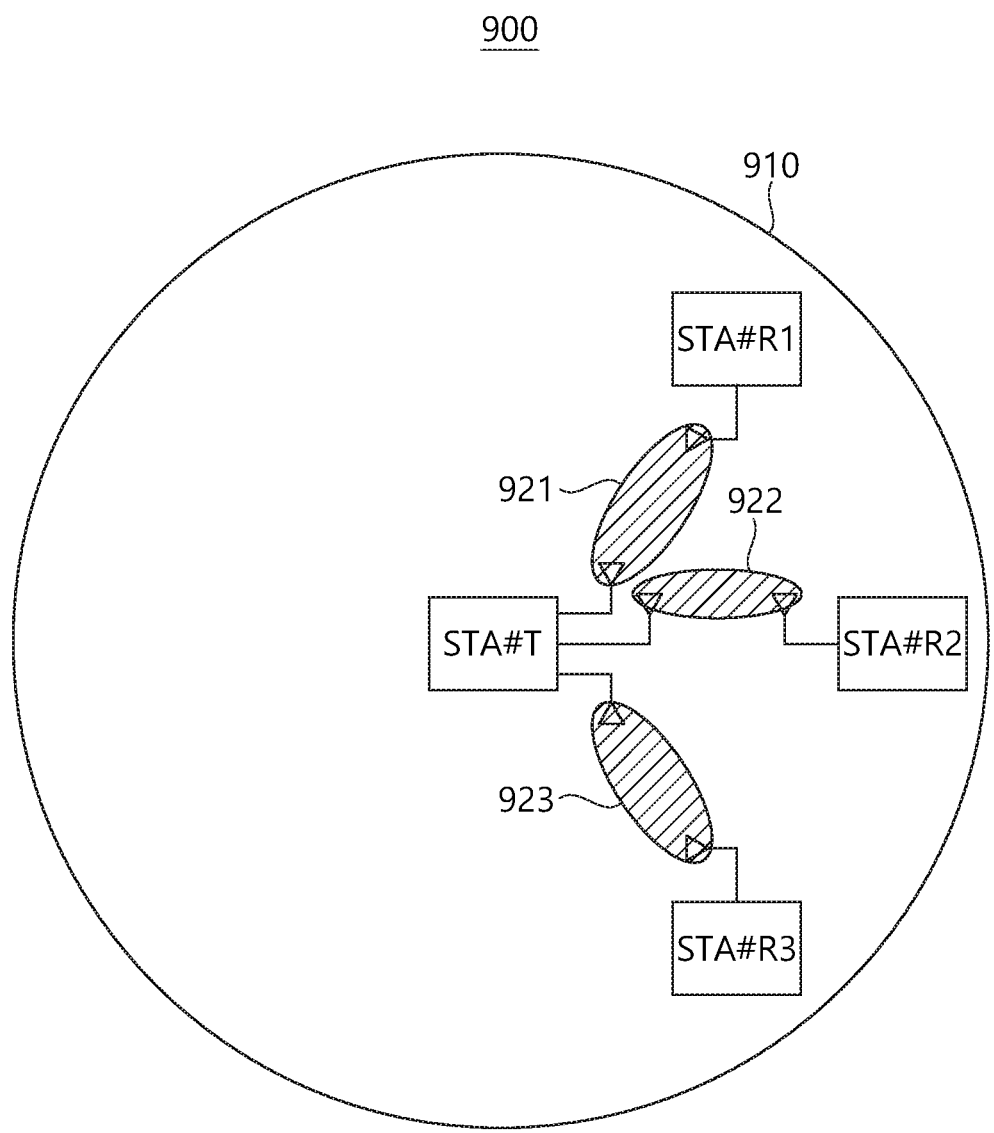
FIG. 9 shows wireless terminals which check states of radio channels for frame transmission in a wireless LAN system.

FIG. 9 shows wireless terminals that check states of radio channels for frame transmission in a wireless LAN system.

Referring to FIG. 9, a wireless LAN system 900 may include a transmission terminal STA #T for transmitting frames and a plurality of reception terminals STA #R1, STA #R2 and STA #R3 for receiving frames.

The transmission terminal STA #T in FIG. 9 can perform an omnidirectional CCA procedure in an omnidirectional way for a predetermined time (e.g., a DIFS) in order to transmit a frame buffered for each reception terminal.

That is, the transmission terminal STA #T can determine the state of a radio channel based on signals received from an omnidirectional area 910 for the omnidirectional CCA procedure for a predetermined time (e.g., a DIFS).

Specifically, to perform the omnidirectional CCA procedure, the transmission terminal STA #T can compare an omnidirectional level that is the average power of signals received from all radio channels associated with the transmission terminal STA #T in the omnidirectional area 910 for a predetermined time with a preset first threshold level.

When the omnidirectional level is higher than the first threshold level, the transmission terminal STA #T according to the present embodiment can determine that frame transmission through a wireless medium cannot be performed.

When the omnidirectional level is lower than the first threshold level, the transmission terminal STA #T according to the present embodiment can additionally compare the omnidirectional level with a second threshold level in order to determine states of radio channels in an omnidirectional way.

The transmission terminal STA #T can individually determine whether to perform first to third directional CCA procedures for a plurality of directional regions 921, 922 and 923 according to a result of comparison between the omnidirectional level acquired through the omnidirectional CCA procedure and the second threshold level.

Referring to FIG. 9, the transmission terminal STA #T may be associated with the first reception terminal STA #R1 based on a first radio channel for the first directional region 921. For example, the first radio channel for the first directional region 921 can be understood based on the first to sixth channels ch #1 to ch #6 aforementioned in FIG. 8.

For example, the transmission terminal STA #T may be associated with the second reception terminal STA #R2 based on a second radio channel for the second directional region 922. For example, the second radio channel for the second directional region 922 can be understood based on the first to sixth channels ch #1 to ch #6 aforementioned in FIG. 8.

For example, the transmission terminal STA #T may be associated with the third reception terminal STA #R3 based on a third radio channel for the third directional region 923. For example, the third radio channel for the third directional region 923 can be understood based on the first to sixth channels ch #1 to ch #6 aforementioned in FIG. 8.

According to the present embodiment, the first to third radio channels for the plurality of reception terminals STA #R1, STA #R2 and STA #R3 can be determined in an association step performed by the transmission terminal STA #T.

In addition, the omnidirectional CCA procedure and the directional CCA procedure according to the present embodiment can be performed in a signal detection manner as well as an energy detection manner Processes of performing the omnidirectional CCA procedure and the directional CCA procedure will be described in more detail with reference to the drawings described later.

Figure 10:
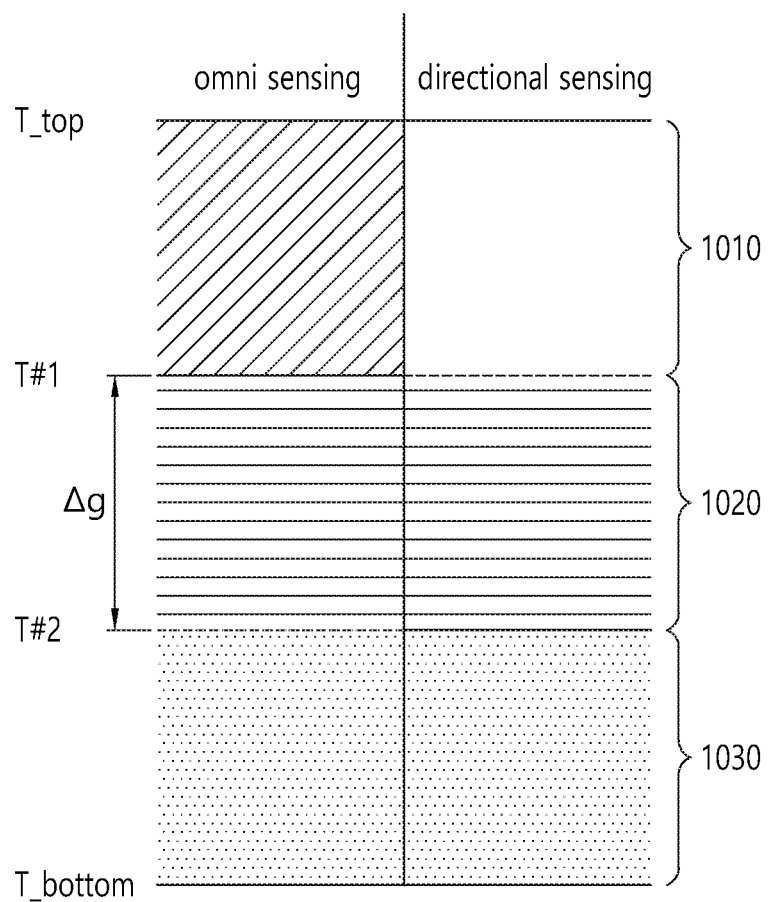
FIG. 10 is a diagram showing a relationship between a first threshold level and a second threshold level.

FIG. 10 is a diagram showing a relationship between the first threshold level and the second threshold level.

Referring to FIGS. 1 to 10, an omnidirectional level acquired through an omnidirectional CCA procedure may correspond to a first region 1010 of FIG. 10. In this case, the omnidirectional level can be higher than the first threshold level T #1.

The first threshold level T #1 according to the present embodiment may be a value preset in a wireless terminal of a wireless LAN system. For example, the first threshold level T #1 may be set to −68 dBm.

With respect to the omnidirectional CCA procedure, CCA can indicate "busy" for start of valid DMG control mode transmission at a reception level higher than −68 dBm with a probability higher than 90% within 3 µs.

The omnidirectional level acquired through the omnidirectional CCA procedure may correspond to a second region 1020. In this case, the omnidirectional level may be lower than the first threshold level T #1 and higher than the second threshold level T #2.

According to the present embodiment, the second threshold level T #2 can be set to be lower than the first threshold level T #1 by an offset level $\Delta g$ in consideration of a beamforming gain. For example, the second threshold level T #2 can be set to −82 dBm lower than the first threshold level T #1 by 14 dBm.

The omnidirectional level acquired through the omnidirectional CCA procedure may correspond to a third region 1030. In this case, an input level may be lower than the second threshold level T #2.

Information on the second threshold level according to the present embodiment can be acquired through a capability negotiation procedure performed for capability negotiation with other wireless terminals. For example, the capability negotiation procedure can be understood as a procedure performed after completion of a search procedure and an authentication/association procedure in relations with other wireless terminals.

In addition, information about whether a wireless terminal can perform a directional CCA procedure and information on the second threshold level for the directional CCA procedure can be acquired through the capability negotiation procedure.

For a plurality of directional CCA procedures individually performed for a plurality of directional antenna modules of a wireless terminal, the same second threshold level or different second threshold levels may be set.

Further, information on the second threshold level according to the present invention may be the same as or different from the threshold level for CCA mentioned in 802.11 11ad standard document. If the information on the second threshold level is different from the threshold level of 802.11 11ad standard document, the information on the second threshold level can be signaled using an additional frame.

For example, the additional frame may be a beacon frame, a frame including an EDMG header, a frame including a MAC header or a grant frame.

Information about whether a directional CCA procedure can be performed can be defined using 1 bit (or 2 bits) in the additional frame. For example, when the 1 bit indicates "0", the wireless terminal can support the directional CCA procedure. On the other hand, when the 1 bit indicates "1", the wireless terminal may not support the directional CCA procedure.

The information on the second threshold level for the directional CCA procedure can be defined using 1 bit (or n bits, n being a natural number equal to or greater than 2). For example, the wireless terminal can acquire the information on the second threshold level for the directional CCA procedure according to index information received from another wireless terminal based on predetermined table information for the second threshold level.

For example, the wireless terminal according to the present embodiment can acquire the information on the second threshold level for the directional CCA procedure based on gap information received from another wireless terminal.

In this case, the gap information may be a value corresponding to a difference from the first threshold level for the omnidirectional CCA procedure which is preset in the wireless terminal. Further, the gap information may be represented by a value (e.g., 14 dBm) corresponding to difference between the first threshold level and the second threshold level using bits.

Moreover, the wireless terminal according to the present embodiment can acquire the information on the second threshold level for the directional CCA procedure according to index information received from another wireless terminal while separately managing a table with respect to the gap information.

Further, to acquire information on the first threshold level that is a determination criterion for the omnidirectional CCA procedure in an omnidirectional way, a capability negotiation procedure with respect to other wireless terminals may be required.

Information exchanged through the capability negotiation procedure can include information on the first threshold level for the omnidirectional CCA procedure in an omnidirectional way.

The information on the first threshold level according to the present embodiment may be the same as or different from the threshold level for CCA mentioned in 802.11 11ad standard document. If the information on the first threshold level is different from the threshold level of 802.11 11ad standard document, the information on the first threshold level can be signaled using an additional frame.

For example, the additional frame may be a beacon frame, a frame including an EDMG header, a frame including a MAC header or a grant frame.

Information about whether an omnidirectional CCA procedure can be performed can be defined using 1 bit (or 2 bits) in the additional frame.

For example, when the 1 bit indicates "0", the wireless terminal can support the omnidirectional CCA procedure. On the other hand, when the 1 bit indicates "1", the wireless terminal may not support the omnidirectional CCA procedure.

The information on the first threshold level for the omnidirectional CCA procedure can be defined using 1 bit (or n bits, n being a natural number equal to or greater than 2). For example, the wireless terminal can acquire the information on the first threshold level for the omnidirectional CCA procedure according to index information received from another wireless terminal based on predetermined table information for the first threshold level.

For example, the wireless terminal according to the present embodiment can acquire the information on the first threshold level for the omnidirectional CCA procedure based on gap information received from another wireless terminal.

The gap information may be a value corresponding to a difference between a threshold level for a CCA procedure (i.e., when a directional method is not supported) defined in 802.11 11ad standard document and the first threshold level for the omnidirectional CCA procedure (i.e., when an omnidirectional method is supported) according to the present embodiment.

Alternatively, the gap information may be represented by a value corresponding to a difference between the threshold level for a CCA procedure (i.e., when a directional method is not supported) defined in 802.11 11ad standard document and the first threshold level for the omnidirectional CCA procedure (i.e., when an omnidirectional method is supported) according to the present embodiment using bits.

Moreover, the wireless terminal according to the present embodiment can acquire the information on the first threshold level for the omnidirectional CCA procedure according to index information received from another wireless terminal while separately managing a table with respect to the gap information.

The information on the first threshold level and the information on the second threshold level of the disclosure can be transmitted using a reserved bit among frames defined in 802.11 11ad standard document.

Figure 11:
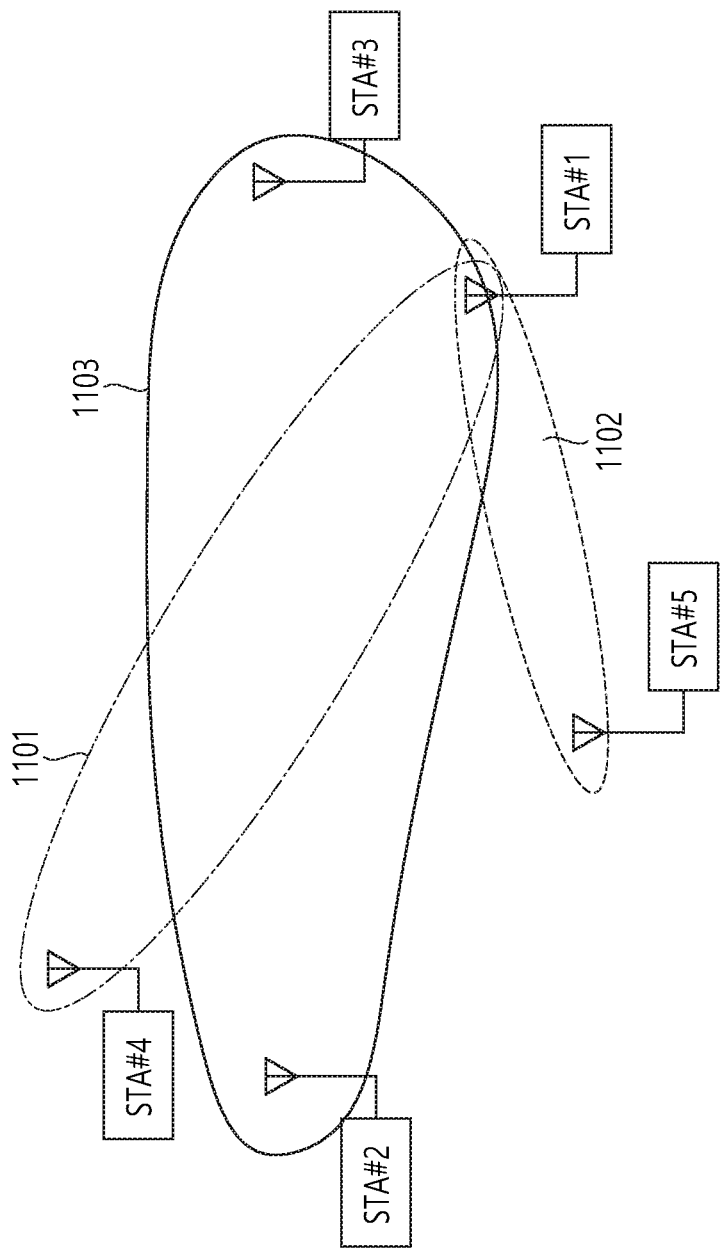
FIG. 11 is an exemplary diagram for illustrating a method for transmitting a frame based on spatial reuse according to an embodiment.

FIG. 11 is an exemplary diagram for illustrating a method for transmitting a frame based on spatial reuse according to an embodiment.

FIG. 11 illustrates a relationship among a plurality of wireless terminals STA #1 to STA #5 based on a plurality of directional antenna modules. The plurality of wireless terminals STA #1 to STA #5 shown in FIG. 11 can be understood as terminals belonging to one basic service set (BSS) managed by an AP (not shown).

The first wireless terminal STA #1 of FIG. 11 can include a first directional antenna module based on a first radio channel in a first direction and a second directional antenna module based on a second radio channel in a second direction.

For example, the first radio channel can be understood based on the first to sixth channels ch #1 to ch #6 aforementioned in FIG. 8. Similarly, the second radio channel can be understood based on the first to sixth channels ch #1 to ch #6 aforementioned in FIG. 8.

The first and second directional antenna modules of the first radio terminal STA #1 may be illustrated as a single antenna as shown in FIG. 11 or illustrated as physically (or logically) separate antennas.

A first transmission area 1101 shown in FIG. 11 is an area aligned in the first direction and can be understood as an area for frames to be transmitted from the first STA STA #1 to the fourth STA STA #4. Specifically, the first transmission area 1101 can be understood as an area for frames transmitted according to beamforming based on the first directional antenna module of the first STA STA #1.

A second transmission area 1102 shown in FIG. 11 is an area aligned in the second direction and can be understood as an area for frames to be transmitted from the first STA STA #1 to the fifth STA STA #5. Specifically, the second transmission area 1102 can be understood as an area for frames transmitted according to beamforming based on the second directional antenna module of the first STA STA #1.

A third transmission area 1103 shown in FIG. 11 is an area aligned in a third direction and can be understood as an area for frames to be transmitted from the second STA STA #2 to the third STA STA #3. Specifically, the third transmission area 1103 can be understood as an area for frames transmitted according to beamforming based on the directional antenna module of the second STA STA #2.

Figure 12:
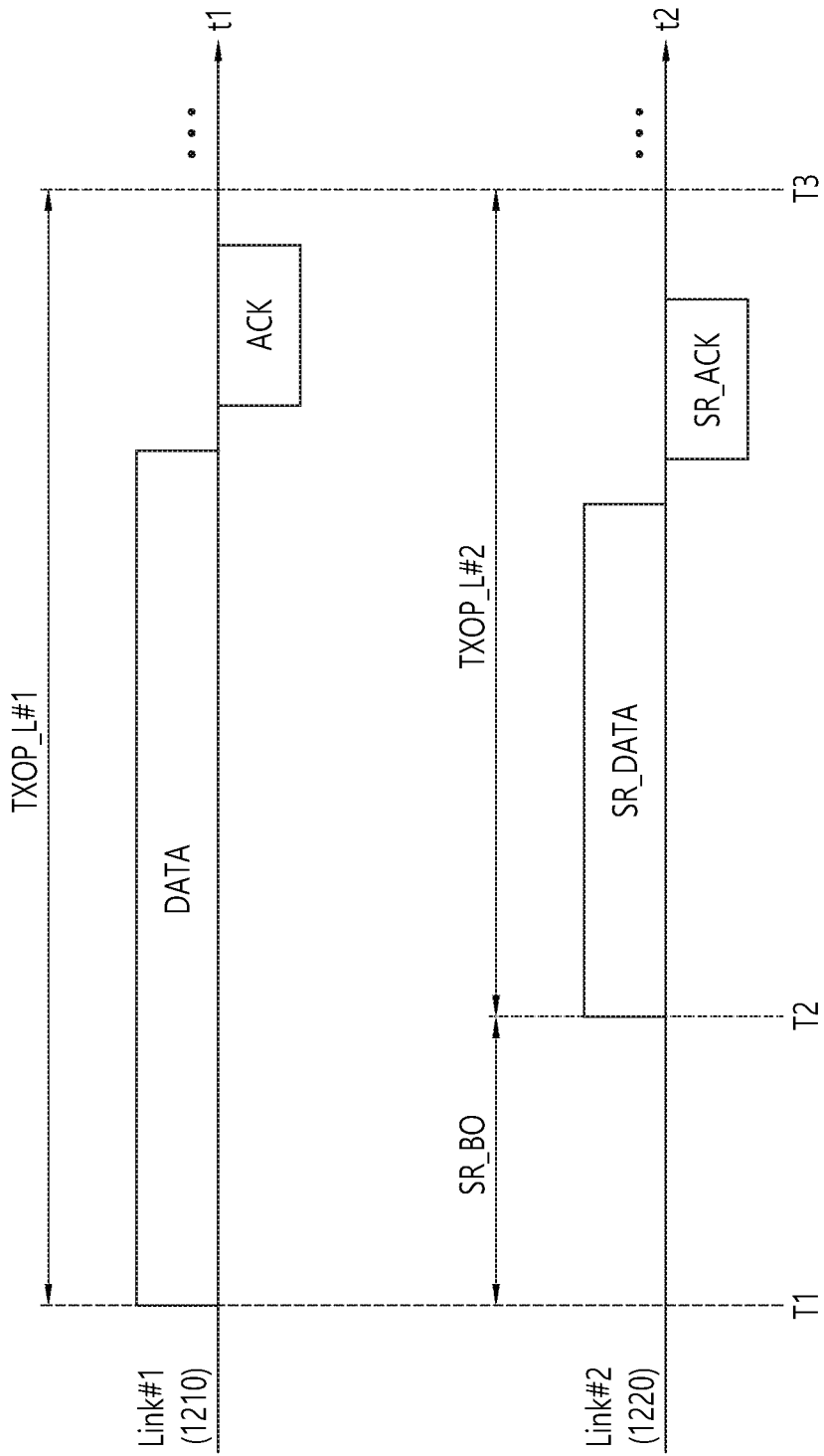
FIG. 12 is a timing diagram showing the method for transmitting a frame based on spatial reuse (SR) according to an embodiment.

FIG. 12 is a timing diagram showing the method for transmitting a frame based on spatial reuse (SR) according to an embodiment.

Referring to FIGS. 1 to 12, a first link Link #1 1210 can be understood as a link for communication between a second STA (e.g., STA #2 in FIG. 11) and a third STA (e.g., STA #3 in FIG. 11). In addition, a second link Link #2 1220 can be understood as a link for communication between a first STA (e.g., STA #1 in FIG. 11) and a fifth STA (e.g., STA #5 in FIG. 11).

Referring to FIG. 12, the horizontal axis of the first link 1210 represents a time t1 and the vertical axis of the first link 1210 represents frames exchanged in the first link 1210. The horizontal axis of the second link 1220 represents a time t2 and the vertical axis of the second link 1220 represents frames exchanged in the second link 1220.

At a time T1 in FIG. 12, the second STA (e.g., STA #2 in FIG. 11) of the first link 1210 can be understood as a terminal that has acquired a transmission opportunity TXOP to occupy a wireless medium for a predetermined time.

For example, information indicating the time (e.g., TXOP_L #1, T1 to T3 in FIG. 12) predetermined for the transmission opportunity TXOP acquired by the second STA (e.g., STA #2 in FIG. 11) can be included in a data frame (e.g., DATA in FIG. 12).

The second STA (e.g., STA #2 in FIG. 11) of the first link 1210 can transmit the data frame (e.g., DATA in FIG. 12) according to a beamforming technique based on a directional antenna module of the second STA (e.g., STA #2 in FIG. 11). For example, the data frame (e.g., DATA in FIG. 12) can be transmitted through the third transmission area 1103 of FIG. 11.

Subsequently, an ACK frame can be received from the third STA (e.g., STA #3 in FIG. 11) as a response to the data frame (e.g., DATA in FIG. 12). For example, the ACK frame can be received from an area other than the third transmission area 1103 of FIG. 11.

The first STA (e.g., STA #1 in FIG. 11) of the second link 1220 in FIG. 12 may be affected by interference caused by the data frame (e.g., DATA in FIG. 12) transmitted through the third transmission area 1103.

For example, the data frame (e.g., DATA in FIG. 12) transmitted through the third transmission area 1103 may be an interference frame from the viewpoint of the first STA (e.g., STA #1 in FIG. 11).

A backoff procedure for spatial reuse (SR) (i.e., SR_BO) mentioned in FIG. 12 can be performed based on contention among a plurality of terminals (not shown) that have received interference caused by the data frame DATA. That is, the disclosure is not limited to a case in which one STA receives interference caused by the data frame DATA as shown in FIG. 11.

In addition, an STA that performs the backoff procedure SR_BO for spatial reuse (SR) may be referred to as an SR STA in the disclosure.

According to the present embodiment, a separate SR EDCA parameter set can be defined for each AC in order to prevent collision between SR STAs. For example, information on the SR EDCA parameter set can be defined as shown in Table 3 below.

TABLE 3

| AC | CWmin[AC] | CWmax[AC] | SR_CWmax[AC] | AIFS[AC] |
|---|---|---|---|---|
| AC_BK | CWmin[AC_BK] | CWmax[AC_BK] | SR_CWmax[AC_BK] | AIFS[AC_BK] |
| AC_BE | CWmin[AC_BE] | CWmax[AC_BE] | SR_CWmax[AC_BE] | AIFS[AC_BE] |
| AC_VI | CWmin[AC_VI] | CWmax[AC_VI] | SR_CWmax[AC_VI] | AIFS[AC_VI] |
| AC_VO | CWmin[AC_VO] | CWmax[AC_VO] | SR_CWmax[AC_VO] | AIFS[AC_VO] |

Referring to Table 3, the SR EDCA parameter set according to the present embodiment can include SR_CWmax[AC] respectively corresponding to a plurality of ACs.

For example, when the access category (AC) of a frame to be transmitted by an SR STA is AC_BK, an integer value (e.g., 15) corresponding to SR_CWmax[AC_BK] can be defined as a value smaller than an integer value (e.g., 31) corresponding to CWmax[AC_BK].

For example, when the access category (AC) of a frame to be transmitted by an SR STA is AC_BE, an integer value (e.g., 15) corresponding to SR_CWmax[AC_BE] can be defined as a value smaller than an integer value (e.g., 31) corresponding to CWmax[AC_BE].

For example, when the access category (AC) of a frame to be transmitted by an SR STA is AC_VI, an integer value (e.g., 7) corresponding to SR_CWmax[AC_VI] can be defined as a value smaller than an integer value (e.g., 15) corresponding to CWmax[AC_VI].

For example, when the access category (AC) of a frame to be transmitted by an SR STA is AC_VO, an integer value (e.g., 3) corresponding to SR_CWmax[AC_VO] can be defined as a value smaller than an integer value (e.g., 7) corresponding to CWmax[AC_VO].

According to the present embodiment, SR_CWmax[AC] can be defined in various manners.

For example, SR_CWmax[AC] may be defined as a value obtained by dividing CWmax[AC] by a specific value. In this case, the specific value may be a multiple of 2 or may correspond to the number of links for spatial reuse (SR).

As another example, SR_CWmax[AC] may be defined as a value (i.e., m−1) obtained by reducing an exponential value of 2 of CWmax[AC] (e.g., m is a natural number equal to or greater than 2). Specifically, if CWmax[AC] is "31" corresponding to $2^5-1$, SR_CWmax[AC] can be defined is "15" corresponding to $2^4-1$.

As another example, SR_CWmax[AC] may be set to a random integer value. Specifically, SR_CWmax[AC] can be defined such that all ACs have the same integer value. Alternatively, SR_CWmax[AC] may be defined such that ACs have different integer values. Alternatively, SR_CWmax[AC] may be defined to have the same value as AIFS[AC] corresponding to an AC.

The information on the SR EDCA parameter set defined Table 3 is merely an example and the disclosure is not limited thereto. As another example, the information on the SR EDCA parameter set may include only SR_CWmax[AC] corresponding to each of the plurality of ACs.

Further, the information on the SR EDCA parameter set can be transmitted to a plurality of SR STAs through a beacon frame periodically transmitted by an AP.

The SR STA according to the present embodiment can set an SR backoff value based on mathematical expression 1 and Table 3 in order to acquire SR_TXOP for SR.

In mathematical expression 1, Random(i) is a function that uses uniform distribution and generates a random integer between "0" and CW[i]. CW[i] can be understood as a contention window selected between a minimum contention window CWmin[i] and a maximum contention window CWmax[i].

In mathematical expression 1, i can be understood to correspond to user priority of Table 1. That is, traffic buffered in an ST STA can be understood to correspond to any one of AC_VO, AC_VI, AC_BE and AC_BK of Table 1 based on a value set to i of mathematical expression 1.

For the SR backoff procedure, any integer value between "0" and CW[i] can be selected according to Random(i). In the disclosure, any integer value selected according to Random(i) based on the SR EDCA parameter set can be mentioned as an SR backoff value for an SR STA.

In the SR backoff procedure for SR, if the AC of a frame to be transmitted by an SR STA is AC_BK, the minimum contention window CWmin[i]) and the maximum contention window CWmax[i] can respectively correspond to CWmin[AC_BK] and SR_CWmax[AC_BK] of Table 3.

In the SR backoff procedure for SR, if the AC of a frame to be transmitted by an SR STA is AC_BE, the minimum contention window CWmin[i]) and the maximum contention window CWmax[i] can respectively correspond to CWmin[AC_BE] and SR_CWmax[AC_BE] of Table 3.

In the SR backoff procedure for SR, if the AC of a frame to be transmitted by an SR STA is AC_VI, the minimum contention window CWmin[i]) and the maximum contention window CWmax[i] can respectively correspond to CWmin[AC_VI] and SR_CWmax[AC_VI] of Table 3.

In the SR backoff procedure for SR, if the AC of a frame to be transmitted by an SR STA is AC_VO, the minimum contention window CWmin[i]) and the maximum contention window CWmax[i] can respectively correspond to CWmin[AC_VO] and SR_CWmax[AC_VO] of Table 3.

In addition on the SR EDCA parameter set may further include SR_AIFS [AC] corresponding to each AC as well as the plurality of parameters shown in Table 3.

For example, if the access category (AC) of a frame to be transmitted by an SR STA is AC_BK, an integer value (e.g., 3) corresponding to SR_AIFS[AC_BK] can be defined as a value smaller than an integer value (e.g., 7) corresponding to AIFS[AC_BK] of Table 3.

For example, if the access category (AC) of a frame to be transmitted by an SR STA is AC_BE, an integer value (e.g., 2) corresponding to SR_AIFS[AC_BE] can be defined as a value smaller than an integer value (e.g., 3) corresponding to AIFS[AC_BE] of Table 3.

For example, if the access category (AC) of a frame to be transmitted by an SR STA is AC_VI, an integer value (e.g., 1) corresponding to SR_AIFS[AC_VI] can be defined as a value smaller than an integer value (e.g., 2) corresponding to AIFS[AC_VI] of Table 3.

For example, if the access category (AC) of a frame to be transmitted by an SR STA is AC_VO, an integer value (e.g., 1) corresponding to SR_AIFS[AC_VO] can be defined as a value smaller than an integer value (e.g., 2) corresponding to AIFS[AC_VO] of Table 3.

In a first period T1 to T2 in FIG. 12, the first STA (e.g., STA #1 in FIG. 11) of the second link 1220 can perform the backoff procedure SR_BO for SR in order to acquire a transmission opportunity TXOP with respect to a data frame SR_DATA for SR.

For example, the first STA (e.g., STA #1 in FIG. 11) that performs the SR backoff procedure SR_BO can count down an SR backoff value set based on an SR EDCA parameter set corresponding to the AC type of the data frame SR_DATA for SR. In this case, the SR EDCA parameter set can be understood based on Table3.

In addition, the first STA (e.g., STA #1 in FIG. 11) can perform a directional CCA procedure for a plurality of antenna modules in a period (e.g., T1 to T2 in FIG. 12) in which the SR backoff procedure SR_BO is performed.

Specifically, the first STA (STA #1) can perform the directional CCA procedure based on interference caused by the data frame DATA in order to determine channel states of the first radio channel corresponding to the first transmission area 1101 and the second radio channel corresponding to the second transmission area 1102.

For example, if a power level of an interference frame (e.g., DATA in FIG. 12) received through the first radio channel corresponding to the first transmission area 1101 based on the directional CCA procedure is determined to be over a threshold level (e.g., T #2 in FIG. 10) for the directional CCA procedure, the first STA (STA #1) can determine that the first radio channel corresponding to the first transmission area 1101 is busy.

For example, if a power level of an interference frame (e.g., DATA in FIG. 12) received through the second radio channel corresponding to the second transmission area 1102 based on the directional CCA procedure is determined to be below the threshold level (e.g., T #2 in FIG. 10) for the directional CCA procedure, the first STA (STA #1) can determine that the second radio channel corresponding to the second transmission area 1101 is idle.

Hereinafter, it can be assumed that the first radio channel corresponding to the first transmission area 1101 is determined to be busy and the second radio channel corresponding to the second transmission area 1102 is determined to be idle based on the directional CCA procedure for clear and concise description of FIG. 12.

As additional example, the directional CCA procedure may be performed after an omnidirectional CCA procedure is performed in the first period T1 to T2 in FIG. 12. The omnidirectional CCA procedure and the directional CCA procedure may be alternately performed in the first period T1 to T2 in FIG. 12.

For reference, at the first time T1 in FIG. 12, the second STA (e.g., STA #2 in FIG. 11) of the first link 1210 can be understood as a terminal that has completed a legacy backoff procedure set based on a legacy EDCA parameter set (refer to Table 2, for example).

At the second time T2 in FIG. 12, it can be assumed that the backoff procedure SR_BO for SR is completed by the first STA (e.g., STA #1 in FIG. 11) of the second link 1220 for the first time.

In other words, at the second time T2 in FIG. 12, the first STA (e.g., STA #1 in FIG. 11) of the second link 1220 can be understood as a terminal that has acquired a transmission opportunity SR_TXOP to occupy a wireless medium through SR for a predetermined time.

Further, at the second time T2 in FIG. 12, the first STA (e.g., STA #1 in FIG. 11) of the second link 1220 can initiate transmission of a data frame SR_DATA for SR through the second radio channel determined to be idle through the directional CCA procedure.

For example, information indicating a predetermined transmission period (e.g., TXOP_L #2, T2 to T3 in FIG. 12) for transmission of the data frame SR_DATA for SR can be included in the data frame SR_DATA for SR.

When the state of a radio channel corresponding to a specific antenna module in a specific direction is determined to be idle through the directional CC procedure, an SR STA can issue PHY-CCARESET. request primitive in order to initiate SR in the corresponding direction.

Further, when the state of a radio channel corresponding to a specific direction is determined to be idle through the directional CCA procedure, the SR STA may not update a NAV timer based on a frame corresponding to interference.

According to the present embodiment, a link (i.e., Link #2 in FIG. 12) according to SR can be used for SR only within a transmission period of a main link (i.e., Link #1 in FIG. 12) that is a base.

For example, the data frame SR_DATA for SR and SR_ACK therefor can be received only within a predetermined time (e.g., T3 in FIG. 12) for transmission of the data frame DATA.

However, the present embodiment is not limited thereto, and the link (i.e., Link #2 in FIG. 12) according to SR may be used for a period that exceeds the transmission period of the main link (i.e., Link #1 in FIG. 12) that is a base. Alternatively, the link (i.e., Link #2 in FIG. 12) according to SR may be used irrespective of the transmission period of the main link (i.e., Link #1 in FIG. 12) that is a base.

Although only one link (i.e., Link #2 in FIG. 12) according to SR is illustrated in FIG. 12, a plurality of links (i.e., Link #2 in FIG. 12) according to SR may be provided.

According to the present embodiment illustrated in FIG. 12, a range in which an SR backoff value is set based on an SR EDCA parameter set may be narrower than a range in which a legacy backoff value is set based on a legacy EDCA parameter set. Therefore, according to the present embodiment, a time required for an SR backoff procedure for SR can be reduced to be shorter than a time required for a legacy backoff procedure.

Figure 13:
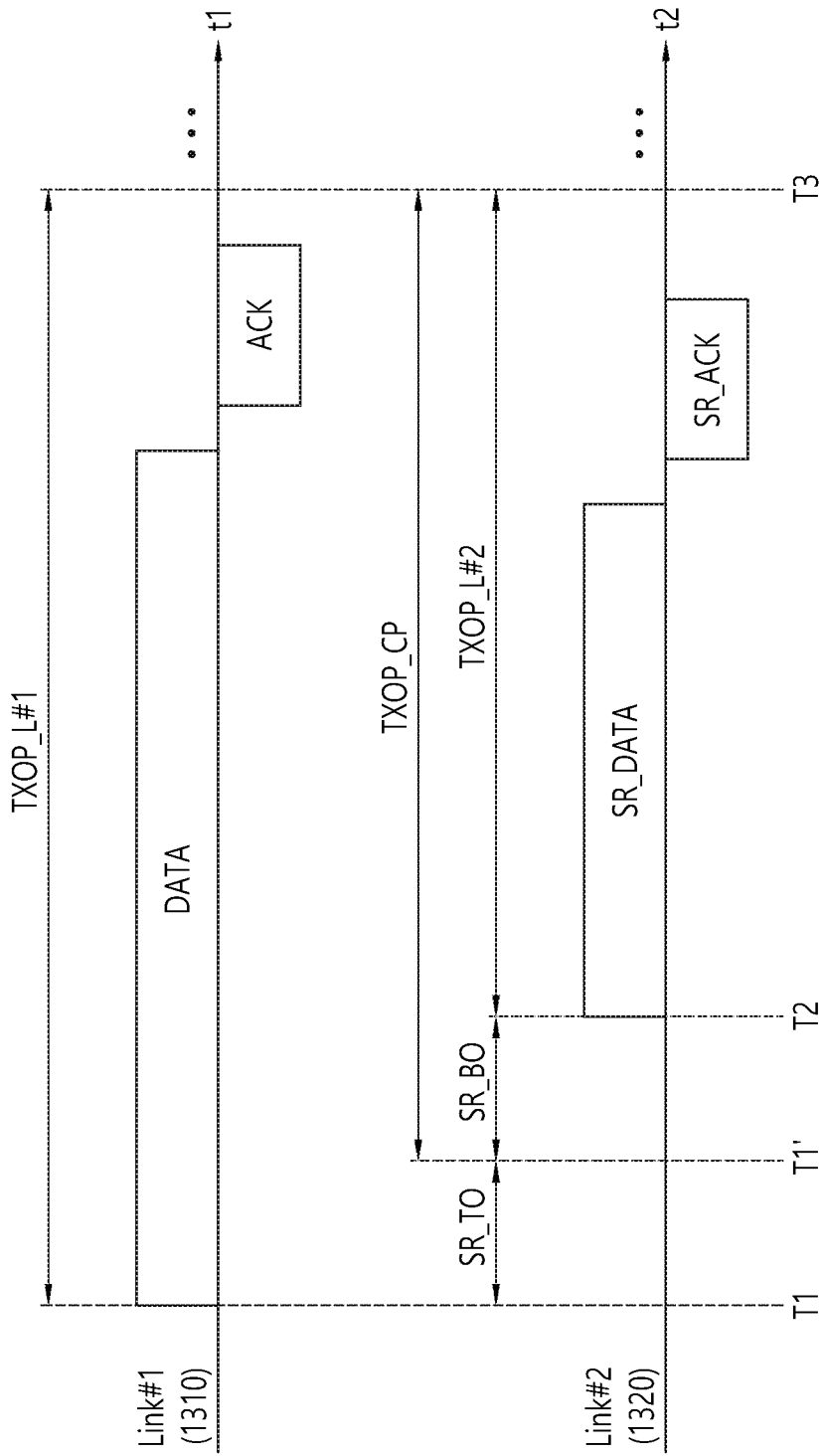
FIG. 13 is a timing diagram showing a method for transmitting a frame based on spatial reuse according to another embodiment.

FIG. 13 is a timing diagram showing a method for transmitting a frame based on SR according to another embodiment.

A first link Link #1 1310 in FIG. 13 can be understood based on the description of the first link Link #1 1210 in FIG. 12. A second link Link #2 1320 in FIG. 13 can be understood based on the description of the second link Link #2 1220 in FIG. 12.

Additionally, a first period T1 to T2 in FIG. 13 can include a spatial reuse timeout (SR_TO) period (e.g., T1 to T1' in FIG. 13) for determining a start time of a backoff procedure SR_BO.

For example, the period SR_TO (e.g., T1 to T2' in FIG. 13) may be a period corresponding to a predetermined time. A time (i.e., T1') at which the period SR_TO (e.g., T1 to T2' in FIG. 13) has elapsed can be understood as a time at which the SR backoff procedure ST_BO is initiated.

Figure 14:
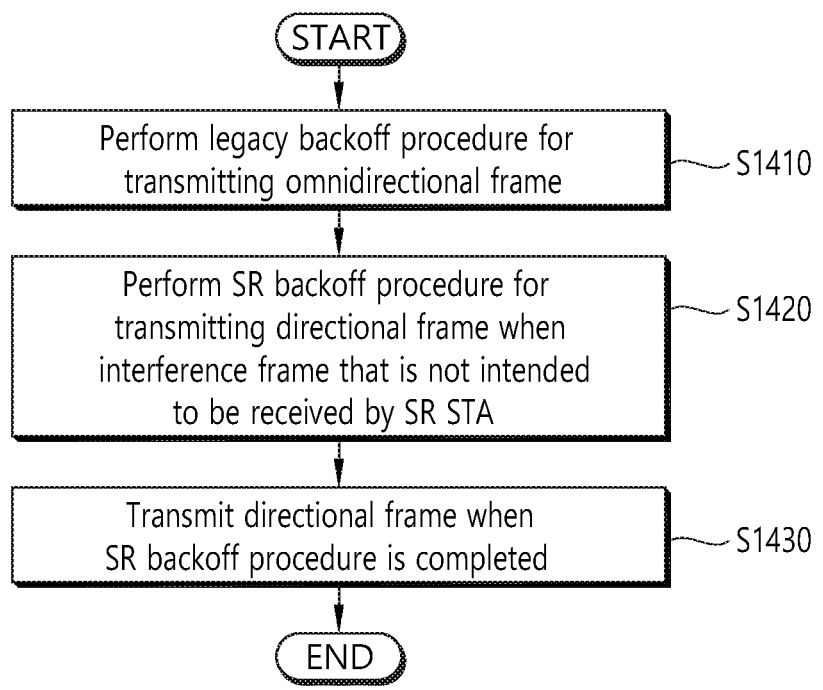
FIG. 14 is a flowchart showing a method for transmitting a frame based on spatial reuse according to the present embodiment.

FIG. 14 is a flowchart showing a method for transmitting a frame based on spatial reuse according to the present embodiment. An SR STA according to the present embodiment may include a plurality of directional antenna modules. For example, the SR STA according to the present embodiment can be understood based on the aforementioned wireless terminal 700 shown in FIG. 7.

Referring to FIGS. 1 to 14, the SR STA (e.g., STA #1 in FIG. 11) can perform a legacy backoff procedure by counting down a first backoff value set based on a legacy EDCA parameter set in order to transmit an omnidirectional frame in step S1410.

For example, the legacy EDCA parameter set may include the aforementioned information included in Table 2. For example, the first backoff value may correspond to the legacy backoff value mentioned in FIG. 12.

Specifically, the first backoff value may be an integer value set between "0" and a first counter window (CW). In this case, the first CW may be a value between CWmin[AC] and CWmax[AC] in Table 2 which correspond to the AC of a frame to be transmitted by the SR STA.

In step S1420, the SR STA (e.g., STA #1 in FIG. 11) can perform an SR backoff procedure by counting down a second backoff value set based on an SR EDCA parameter set in order to transmit a directional frame when an interference frame (e.g., DATA in FIGS. 12 and 13) that is not intended to be received by the SR STA (e.g., STA #1 in FIG. 11) is received.

For example, the directional frame can be understood as the data frame (e.g., SR_DATA) for SR in FIGS. 12 and 13. For example, the SR EDCA parameter set can be understood as the information included in Table 3. For example, the second backoff value can be understood as the aforementioned SR backoff value.

Specifically, the second backoff value may be an integer value set between "0" and a second counter window (CW). In this case, the second CW can be selected based on CWmin[AC] in Table 2 and CWmax[AC] in Table 3 which correspond to the AC of a frame to be transmitted by the SR STA.

According to the present embodiment, the value SR_CWmax in Table 3 may be set to a value less than the value CWmax in Table 3. Further, the SR STA can suspend the legacy backoff procedure when the interference frame is received, which is not shown in FIG. 14.

For example, the RA field of the interference frame (e.g., DATA in FIGS. 12 and 13) may be set such that it does not indicate the SR STA (e.g., STA #1 in FIG. 11). Further, the interference frame (e.g., DATA in FIGS. 12 and 13) may be an omnidirectional frame or a directional frame transmitted by another STA.

In step S1430, the SR STA can transmit the directional frame (e.g., SR_DATA in FIGS. 12 and 13) when the SR backoff procedure is completed thereby.

Additionally, the legacy EDCA parameter set may further include a legacy AIFS value corresponding to each of the plurality of ACs. For example, the legacy AIFS value corresponding to each AC can be understood as AIFS[AC] in Table 2.

The SR EDCA parameter set may further include an SR_AIFS value corresponding to each AC. For example, the SR_AIFS value corresponding to each AC may be set to a value smaller than the legacy AIFS value.

According to the present embodiment, the SR EDCA parameter set for performing the SR backoff procedure for SR can be defined.

Figure 15:
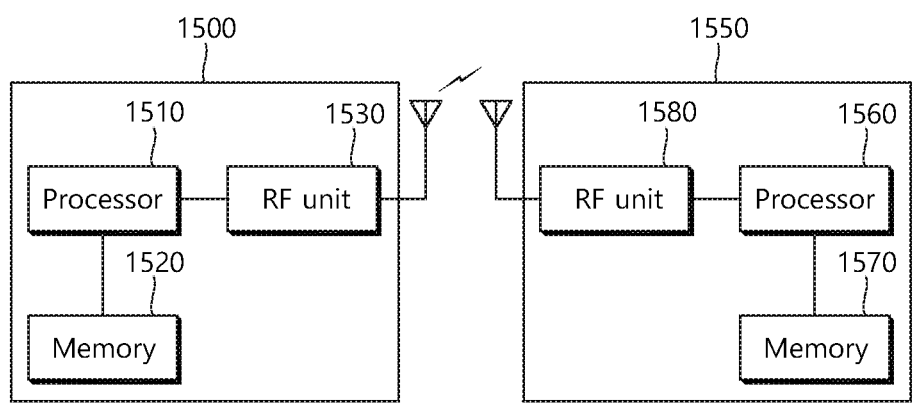
FIG. 15 is a block diagram showing a wireless terminal to which embodiments of the disclosure are applicable.

FIG. 15 is a block diagram showing a wireless terminal to which embodiments of the disclosure are applicable.

Referring to FIG. 15, the wireless terminal is an STA capable of realizing the above-described embodiments and may be a non-AP station (non-AP STA). The wireless terminal may correspond to the aforementioned user or a transmission terminal that transmits a signal to the user.

An AP 1500 includes a processor 1510, a memory 1520, a radio frequency (RF) unit 1530. The RF unit 1530 can be connected to the processor 1510 and transmit/receive RF signals. The processor 1510 can implement the functions, processes and/or methods proposed in the disclosure. For example, the processor 1510 can perform operations according to the above-described embodiments.

A non-AP STA 1550 includes a processor 1560, a memory 1570, a radio frequency (RF) unit 1580.

The RF unit 1580 can be connected to the processor 1560 and transmit/receive RF signals. The processor 1560 can implement the functions, processes and/or methods proposed in the disclosure. For example, the processor 1560 can perform non-AP STA operations according to the above-described embodiments.

The processors 1510 and 1560 may include an application-specific integrated circuit (ASIC), other chipsets, a logic circuit, a data processing device and/or a converter for converting a baseband signal and an RF signal to each other. The memories 1520 and 1570 may include a read-only memory (ROM), a random access memory (RAM), a flash memory, a memory card, a storage medium and/or other storage devices. The RF units 1530 and 1580 may include one or more antennas for transmitting and/or receiving RF signals.

When embodiments of the disclosure are realized as software, the above-described techniques can be realized as modules (processes, functions, etc.) that execute the above-described functions. The modules may be stored in the memories 1520 and 1570 and executed by the processors 1510 and 1560. The memories 1520 and 1570 may be provided inside or outside the processors 1510 and 1560 and connected to the processors 1510 and 1560 through various known means.

The non-AP STA 1550 includes the processor 1560, the memory 1570 and the RF unit 1580.

The RF unit 1580 can be connected to the processor 1560 and transmit/receive RF signals.

The processor 1560 can implement the functions, processes and/or methods proposed in the present embodiment. For example, the processor 1560 may be realized to perform non-AP STA operations according to the above-described embodiments. The processor 1560 can perform the operation of a non-AP STA disclosed in the present embodiment shown in FIGS. 1 to 14.

The processors 1510 and 1560 may include an ASIC, other chipsets, a logic circuit, a data processing device and/or a converter for converting a baseband signal and an RF signal to each other. The memories 1520 and 1570 may include a read-only memory (ROM), a random access memory (RAM), a flash memory, a memory card, a storage medium and/or other storage devices. The RF units 1530 and 1580 may include one or more antennas for transmitting and/or receiving RF signals.

When embodiments of the disclosure are realized as software, the above-described techniques can be realized as modules (processes, functions, etc.) that execute the above-described functions. The modules may be stored in the memories 1520 and 1570 and executed by the processors 1510 and 1560. The memories 1520 and 1570 may be provided inside or outside the processors 1510 and 1560 and connected to the processors 1510 and 1560 through various known means.

Although specific embodiments have been described in the detailed description of the disclosure, various modifications are possible without departing from the scope of the disclosure. Accordingly, the scope of the invention should be determined by the appended claims and their legal equivalents, not by the above description.

What is claimed is:

1. A method for transmitting a frame based on spatial reuse, performed by a spatial reuse station (SR STA) including a plurality of directional antenna modules in a wireless LAN system, the method comprising:
    performing a legacy backoff procedure by counting down a first backoff value set based on a legacy enhanced distributed channel access (EDCA) parameter set to transmit an omnidirectional frame, the legacy EDCA parameter set including a legacy CWmin value and a legacy CWmax value related to each of a plurality of access categories (ACs);
    receiving an interference frame of which a receive address (RA) is another SR STA distinct from the SR STA, wherein the interference frame is received in a first transmission opportunity (TXOP) period;
    in response to the received interference frame, determining a start time for an SR backoff procedure, as a time after a predetermined period from a start time of the reception of the interference frame;
    waiting until the start time for the SR backoff procedure;
    performing the SR backoff procedure to transmit, through one of a plurality of links for the SR, a directional frame, by counting down a second backoff value to zero,
    wherein the second backoff value is set based on an SR EDCA parameter set distinct from the legacy EDCA parameter set,
    wherein the SR EDCA parameter set includes an SR_CWmin value and an SR_CWmax value related to each of the plurality of ACs, and
    wherein the SR_CWmax value is set to a value which is obtained by dividing the legacy CWmax value by the number of the plurality of links;
    obtaining, based on the SR backoff procedure, a second TXOP period, wherein an end time of the second TXOP period is equal to an end time of the first TXOP period; and
    transmitting the directional frame through the one of the plurality of links in the second TXOP period.

2. The method of claim 1, wherein the first backoff value is an integer value set between "0" and a first counter window (CW) value, the first CW value being selected based on the legacy CWmin value and the legacy CWmax value, and
    the second backoff value is an integer value set between "0" and a second counter window (CW) value, the second CW value being selected based on the legacy CWmin value and the legacy CWmax value.

3. The method of claim 1, further comprising suspending the legacy backoff procedure when the interference frame is received.

4. The method of claim 1, wherein the legacy EDCA parameter set further includes a legacy arbitration interframe space (AIFS) value corresponding to each of the plurality of ACs, and the SR EDCA parameter set further includes an SR_AIFS value corresponding to each of the plurality of ACs, the SR_AIFS value being set to a value smaller than the legacy AIFS value.

5. A spatial reuse station (SR STA) performing a method for transmitting a frame based on spatial reuse in a wireless LAN system, the SR STA comprising:
    a transceiver for transmitting and receiving radio frequency (RF) signals through a plurality of directional antenna modules; and
    a processor connected to the transceiver,
    wherein the processor is configured:
    to perform a legacy backoff procedure by counting down a first backoff value set based on a legacy EDCA parameter set to transmit an omnidirectional frame, the legacy EDCA parameter set including a legacy CWmin value and a legacy CWmax value related to each of a plurality of access categories (ACs);
    to receive an interference frame of which a receive address (RA) is another SR STA distinct from the SR STA, wherein the interference frame is received in a first transmission opportunity (TXOP) period;
    in response to the received interference frame, to determine a start time for an SR backoff procedure, as a time after a predetermined period from a start time of the reception of the interference frame;
    to wait until the start time for the SR backoff procedure;
    to perform the SR backoff procedure to transmit, through one of a plurality of links for the SR, a directional frame, by counting down a second backoff value to zero,
    wherein the second backoff value is set based on an SR EDCA parameter set distinct from the legacy EDCA parameter set,
    wherein the SR EDCA parameter set includes an SR_CWmin value and an SR_CWmax value related to each of the plurality of ACs,
    wherein the SR_CWmax value is set to a value which is obtained by dividing the legacy CWmax value by the number of the plurality of links;
    to obtain, based on the SR backoff procedure, a second TXOP period, wherein an end time of the second TXOP period is equal to an end time of the first TXOP period; and
    to transmit the directional frame through the one of the plurality of links in the second TXOP period.

6. The STA of claim 5, wherein the first backoff value is an integer value set between "0" and a first counter window (CW) value, the first CW value being selected based on the legacy CWmin value and the legacy CWmax value, and
    the second backoff value is an integer value set between "0" and a second counter window (CW) value, the second CW value being selected based on the legacy CWmin value and the legacy CWmax value.

7. The STA of claim 5, wherein the processor is further configured to suspend the legacy backoff procedure when the interference frame is received.

8. The STA of claim 5, wherein the legacy EDCA parameter set further includes a legacy arbitration interframe space (AIFS) value corresponding to each of the plurality of ACs, and the SR EDCA parameter set further includes an SR_AIFS value corresponding to each of the plurality of ACs, the SR_AIFS value being set to a value smaller than the legacy AIFS value.

* * * * *